(12) United States Patent
Lee et al.

(10) Patent No.: US 9,838,094 B2
(45) Date of Patent: *Dec. 5, 2017

(54) METHOD FOR PROCESSING RECEIVED SIGNAL OF MIMO RECEIVER

(71) Applicant: LG ELECTRONICS INC., Seoul (KR)

(72) Inventors: Kilbom Lee, Seoul (KR); Jiwon Kang, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/122,626

(22) PCT Filed: Dec. 15, 2014

(86) PCT No.: PCT/KR2014/012335
§ 371 (c)(1),
(2) Date: Aug. 30, 2016

(87) PCT Pub. No.: WO2015/137603
PCT Pub. Date: Sep. 17, 2015

(65) Prior Publication Data
US 2017/0070271 A1  Mar. 9, 2017

Related U.S. Application Data

(60) Provisional application No. 61/951,536, filed on Mar. 12, 2014.

(51) Int. Cl.
*H04B 7/04*  (2017.01)
*H04B 7/06*  (2006.01)
(Continued)

(52) U.S. Cl.
CPC ......... *H04B 7/0456* (2013.01); *H04B 7/0413* (2013.01); *H04B 7/0617* (2013.01); *H04W 72/042* (2013.01)

(58) Field of Classification Search
CPC .. H04B 7/0413; H04B 7/0456; H04B 7/0617; H04W 72/042
See application file for complete search history.

(56) References Cited

U.S. PATENT DOCUMENTS

2007/0201536 A1* 8/2007 Nicolas ................ H04B 7/022
375/141
2008/0181285 A1 7/2008 Hwang et al.
(Continued)

FOREIGN PATENT DOCUMENTS

WO  2013023093  2/2013

OTHER PUBLICATIONS

Kentonen, et al., "Implementation of LS, MMSE and SAGE Channel Estimators for Mobile MIMO-OFDM", In: Signals, Systems and Computers (ASILOMAR), 2012, pp. 1092-1096, 5 pages.
(Continued)

*Primary Examiner* — David B. Lugo
(74) *Attorney, Agent, or Firm* — Lee Hong Degerman Kang Waimey

(57) ABSTRACT

Disclosed herein is a method for generating transmitted signals. The method includes selecting a reference resource element (RE) from an RE group including a plurality of REs, generating a common precoder to be shared among the plurality of REs of the RE group based on channel information of the reference RE, generating primary signals, which are precoding signals of the plurality of REs, by applying the common precoder to transmitted data for the plurality of REs, and generating secondary signals by compensating for the primary signals of the REs except for the
(Continued)

reference RE among the plurality of REs using channel information of the REs.

16 Claims, 17 Drawing Sheets

(51) Int. Cl.
*H04W 72/04* (2009.01)
*H04B 7/0456* (2017.01)
*H04B 7/0413* (2017.01)

(56) References Cited

U.S. PATENT DOCUMENTS

| | | | |
|---|---|---|---|
| 2009/0154577 A1 | 6/2009 | Lindoff et al. | |
| 2012/0128044 A1 | 5/2012 | Kim et al. | |
| 2012/0176982 A1 | 7/2012 | Zirwas et al. | |
| 2014/0064354 A1 | 3/2014 | Nakano et al. | |
| 2014/0177531 A1* | 6/2014 | Imamura | H04W 24/10 370/328 |
| 2014/0269519 A1* | 9/2014 | Shan | H04L 5/0051 370/329 |
| 2016/0315748 A1* | 10/2016 | Chen | H04L 5/0051 |
| 2017/0012693 A1* | 1/2017 | Lee | H04B 7/0413 |
| 2017/0041049 A1* | 2/2017 | Lee | H04B 7/0413 |
| 2017/0079047 A1* | 3/2017 | Lee | H04B 7/0413 |

OTHER PUBLICATIONS

PCT International Application No. PCT/KR2014/012335, Written Opinion of the International Searching Authority dated Mar. 9, 2015, 10 pages.
European Patent Office Application Serial No. 14885584.4, Search Report dated Oct. 12, 2017, 8 pages.

* cited by examiner

FIG. 15

METHOD FOR PROCESSING RECEIVED SIGNAL OF MIMO RECEIVER

CROSS-REFERENCE TO RELATED APPLICATIONS

This application is the National Stage filing under 35 U.S.C. 371 of International Application No. PCT/KR2014/012335, filed on Dec. 15, 2014, which claims the benefit of U.S. Provisional Application No. 61/951,536, filed on Mar. 12, 2014, the contents of which are all hereby incorporated by reference herein in their entirety.

TECHNICAL FIELD

The present invention relates to technology related to a method for reducing implementation complexity and memory requirements while minimizing performance deterioration of a transmitter and a receiver in a massive multiple input multiple output (MIMO) environment.

BACKGROUND ART

A multiple input multiple output (MIMO) system refers to a wireless communication system using multiple transmit antennas and multiple receive antennas. In a MIMO system, fading effects occurring in a radio channel may be minimized via a diversity scheme or a plurality of streams may be simultaneously transmitted via spatial multiplexing, thereby improving throughput. If the number of transmit antennas is Nt and the number of receive antennas is Nr, a maximum number of streams transmittable in a spatial multiplexing (SM) scheme is min(Nt, Nr). In particular, in a high signal-to-noise ratio (SNR) environment, it is known that the slope of communication capacity is min(Nt, Nr). Since communication capacity means a maximum amount of information theoretically transmittable on a given channel, communication capacity also increases when the numbers of transmit and receive antennas simultaneously increase.

A massive MIMO system having vast transmit and receive antennas is attracting considerable attention as 5G technology. In many papers and experiments, the massive MIMO system includes one base station (including a distributed antenna system) having multiple antennas and a plurality of user equipments (UEs) each having one antenna. In this case, since the UE has one antenna but several UEs simultaneously receive services from one base station, channels between the base station and the UEs may be understood as MIMO. If the total number of UEs is K, the slope of communication capacity is expressed by min(Nt, K) in a high SNR environment.

Theoretically, when a base station having an infinite number of transmit antennas simultaneously transmits data to several UEs, an optimal transmission algorithm of the base station is a maximal ratio transmission (MRT) algorithm. When one base station receives data transmitted from several UEs to the base station, an optimal reception algorithm of the base station is a maximal ratio combining (MRC) algorithm. Since the MRT and MRC algorithms do not take into account interference, if the number of antennas is finite, performance deterioration occurs but, if the number of antennas is infinite, interference disappears. Therefore, the MRT and MRC algorithms may become optimal solutions.

Since a base station can generate a sharp beam sharp via antenna beamforming, the base station may concentrate energy on a specific UE. In this case, the same information may be transmitted with low power and interference with neighboring UEs may be minimized, thereby minimizing system performance deterioration.

DISCLOSURE

Technical Problem

An object of the present invention devised to solve the problem lies in minimization of received signal detection complexity while maintaining performance of a receiver in a massive MIMO environment.

Another object of the present invention devised to solve the problem lies in minimization of precoder generation complexity while maintaining transmission performance of a transmitter in a massive MIMO environment.

A further object of the present invention devised to solve the problem lies in active adjustment of received signal detection complexity and a transmission precoder generation complexity by adjusting target performance of a transmitter and a receiver according to a communication environment.

A further object of the present invention devised to solve the problem lies in minimization of signal detection complexity even when a receiver cannot know information about correlation between REs.

The technical problems solved by the present invention are not limited to the above technical problems and other technical problems which are not described herein will become apparent to those skilled in the art from the following description.

Technical Solution

The object of the present invention can be achieved by providing a method of generating transmitted signals, including selecting a reference resource element (RE) from an RE group including a plurality of REs, generating a common precoder to be shared among the plurality of REs of the RE group based on channel information of the reference RE, generating primary signals, which are precoding signals of the plurality of REs, by applying the common precoder to transmitted data for the plurality of REs, and generating secondary signals by compensating for the primary signals of the REs except for the reference RE among the plurality of REs using channel information of the REs.

The method may further include generating third signals, which are transmitted signals, by converting the primary signal of the reference RE and the secondary signals of the REs except for the reference RE among the plurality of REs.

The third signals may be generated based on a function $f(t_n, H_n) = H_n^{-1} t_n$ ($n=1, 2, \ldots, N$) to which the channel information of the plurality of REs is applied, and, in the function, $t_n$ may denote the primary signal ($n=1$) of the reference RE or the secondary signals ($n=2, 3, \ldots, N$) of the REs except for the reference RE, and N may denote the number of REs in the RE group.

The common precoder may be a portion of a zero forcing (ZF) precoding matrix, a regularized ZF precoding matrix or a minimum mean square error (MMSE) precoding matrix.

The secondary signals may be generated by compensating for the primary signals via the channel information of the REs and a conjugate gradient (CG), Newtonian method or steepest descent method algorithm.

The secondary signals may be generated by repeatedly performing a compensation process until errors between results computed using the channel information of the REs instead of the common precoder and the primary signals become less than a threshold, and a maximum number of repetitions of the compensation process may be determined according to a MIMO channel environment or user input.

The number of repetitions of the compensation process may be differently set according to the REs except for the reference RE, and the number of repetitions may be inversely proportional to correlation between the reference RE and the REs except for the reference RE.

The generating the common precoder may include generating the common precoder by taking into account the channel information of the reference RE and the channel information of the REs except for the reference RE, and the generating the secondary signals may include generating the second signals by compensating for the primary signals of the REs except for the reference RE and the primary signal of the reference RE based on respective inherent channels thereof.

In another aspect of the present invention, provided herein is a multiple input multiple output (MIMO) transmitter including a transmitter, a receiver, and a processor connected to the transmitter and the receiver and configured to generate transmitted signals, wherein the processor selects a reference resource element (RE) from an RE group including a plurality of REs, generates a common precoder to be shared among the plurality of REs of the RE group based on channel information of the reference RE, generates primary signals, which are precoding signals of the plurality of REs, by applying the common precoder to transmitted data for the plurality of REs, and generates secondary signals by compensating for the primary signals of the REs except for the reference RE among the plurality of REs using channel information of the REs.

Advantageous Effects

According to the embodiments of the present invention have the following effects.

First, as correlation between REs is increased, signal detection complexity of a receiver is decreased. Even when correlation is small, it is possible to decrease complexity without performance loss.

Second, since transmission precoder generation complexity is decreased according to correlation between REs, it is possible to decrease transmitted signal generation complexity without performance deterioration.

Third, received signal detection complexity and transmission precoder generation complexity can be controlled as necessary to adaptively control performance according to communication environment.

Fourth, since a receiver can adaptively set an RE group, performance deterioration does not occur without additionally increasing complexity for measuring correlation between REs.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 15 is a diagram illustrating a process of forming an RE group according to one embodiment of the present invention.

MODE FOR INVENTION

Figure 1:
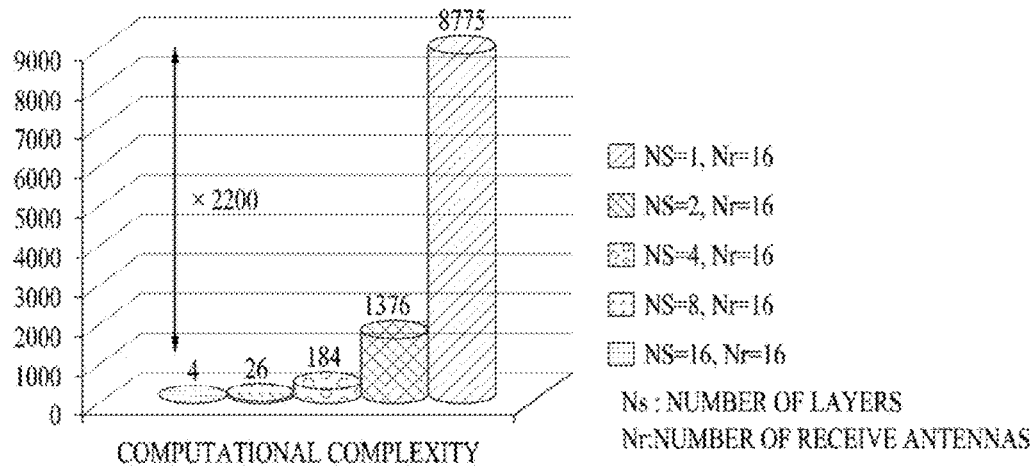
FIG. 1 is a diagram showing computational complexity according to the number of received streams in a multiple input multiple output (MIMO) environment in relation to the present invention.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802 system, a $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

It should be noted that specific terms disclosed in the present invention are proposed for convenience of description and better understanding of the present invention, and the use of these specific terms may be changed to another format within the technical scope or spirit of the present invention.

1. Massive MIMO Receiver 1.1 General MIMO Receiver

To establish a massive MIMO system, a massive MIMO reception algorithm must be developed. As compared to an existing MIMO system, in a massive MIMO system, a receiver needs to be improved in terms of the following two aspects.

Figure 2:
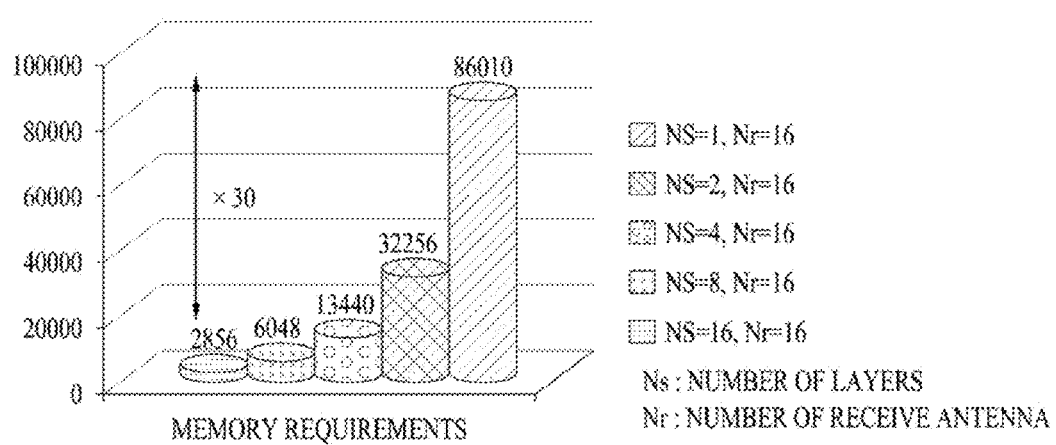
FIG. 2 is a diagram showing memory requirements according to the number of received streams in a MIMO environment in relation to the present invention.

First, in a massive MIMO environment, the number of data streams simultaneously received by the receiver increases. Increase in the number of simultaneously processed data streams leads to increase in computational complexity and memory requirements. This leads to increase in system implementation cost and processing time, thereby imposing a burden on a reception system. Computational complexity and memory requirements according to the number of received streams of an existing MIMO reception algorithm exponentially increase as shown in FIGS. 1 and 2.

Second, in the massive MIMO environment, as the number of interference sources increases, a reception algorithm having improved interference cancellation performance is required. In the massive MIMO system, when a base station simultaneously transmits data to several tens or hundreds of users, each user receives several tens or more of multi-user interference signals except for a data signal transmitted thereto. Accordingly, there is a need for a massive MIMO reception algorithm for efficiently cancelling such interference signals. In addition, efficient cancellation of interference received from neighboring cells or users of neighboring cells is also required.

In order to solve such technical problems, the following technical issues are considered.

First, increase in computational complexity and memory requirements in a massive MIMO environment will be described. If the number of antennas of a transmitter is always greater than the number of antennas of a receiver, the number of streams transmitted by the transmitter is increased in proportion to the number of antennas of the receiver. At this time, the receiver uses a reception filter in order to detect each stream from a received signal. In an LTE system, the filter should be recomputed in every subframe.

Load caused due to such a computation process may be quantified to computational complexity and memory requirements. Complexity and memory requirements are proportional to the square or cube of the number of received streams. Accordingly, as the number $N_s$ of received streams increases, computational complexity and memory requirements rapidly increase, as shown in FIG. 1. Further, since hardware specification is determined by the worst case, hardware implementation cost significantly increases as the number of streams increases.

Hereinafter, a reception algorithm of a conventional MIMO receiver and/or computational complexity and memory requirements according to filter will be described.

The MRC algorithm requires smallest computational complexity $O(N_s^2)$ and memory. However, the MRC algorithm does not take into account interference between streams and thus provides low performance (that is, low reception SINR).

A minimum mean square error (MMSE) filter provides the best performance (that is, high reception SINR) among linear detection methods. However, complexity is expressed by $O(N_s^3)$ and $O(N_s^2)$ additional memories for inverse matrix operation are required. FIGS. 1 and 2 show complexity and memory requirements according to the number of received streams of the MMSE filter, respectively.

For reception using the MMSE filter, an inverse matrix operation for a channel matrix is necessary. The size of the inverse matrix is determined by the number of received streams and, for example, a time required for a high performance field programmable gate array (FPGA) to obtain a 15×15 inverse matrix is about 150 μs. Such time delay corresponds to about 30% of a coherence time of 500 μs assumed in an LTE channel model.

In addition, for inverse matrix operation for MMSE reception, a process of moving all channel information to a new memory is necessary, thereby leading to significant delay. In addition, a processor accesses a memory for inverse matrix operation, thereby leading to additional delay. Such delay significantly increases system processing time.

Lastly, an interference cancellation (IC) filter is a non-linear detection method and can obtain performance corresponding to maximum communication capacity in a D-BLAST receiver which is an example of IC. A V-BLAST receiver having low implementation complexity is configured in the form of a hybrid of MMSE and SIC. In particular, in a MIMO-OFDM environment, the V-BLAST receiver has performance close to maximum communication capacity as channel selectivity increases. However, since the V-BLAST receiver is also based on the MMSE filter, complexity and memory requirements higher than those of the MMSE filter are required.

In addition, the IC method cancels previously detected symbols and layers from a received signal to control interference. Accordingly, if the previously detected values have errors, an error propagation phenomenon in which detection performance deteriorates occurs. Various IC algorithms for solving such a problem have been proposed but have increased complexity as compared to the conventional method.

Figure 3:
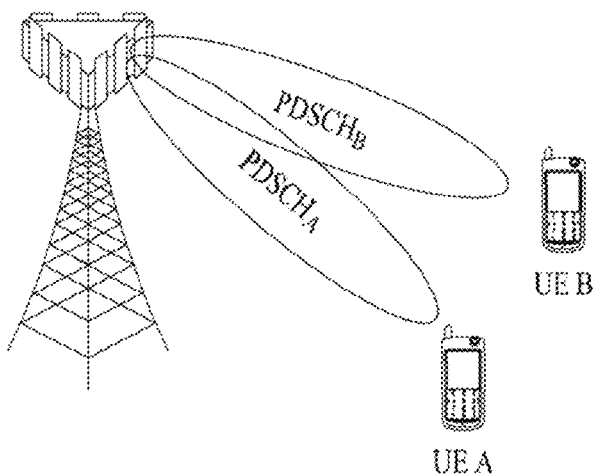
FIG. 3 is a diagram showing interference between UEs in the same cell in a MIMO environment in relation to the present invention.
Figure 4:
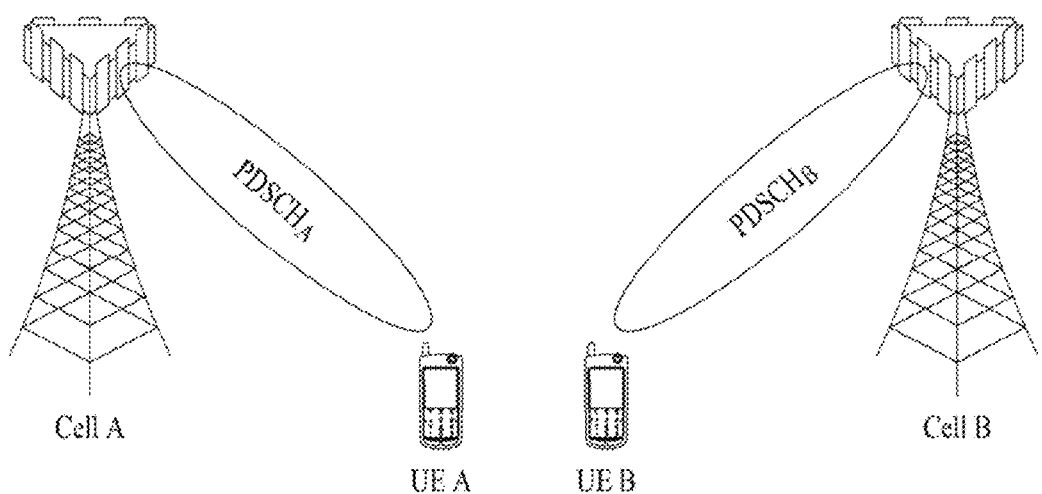
FIG. 4 is a diagram showing interference between neighboring cells in a MIMO environment in relation to the present invention.

FIG. 3 is a diagram showing interference between UEs in the same cell in a MIMO environment in relation to the present invention. FIG. 4 is a diagram showing interference between neighboring cells in a MIMO environment in relation to the present invention. In addition to increase in computational complexity and memory requirements, interference occurring in a massive MIMO environment will be described with reference to FIGS. 3 and 4.

If the number of antennas of a base station is large, one base station may simultaneously support a plurality of UEs. In this case, a signal transmitted from the base station to a UE A acts as interference with respect to a UE B and a signal transmitted to the UE B acts as interference with respect to the UE A. Since the interference is transmitted by the base station along with a desired signal, the interference undergoes the same path loss as the desired signal. Accordingly, power of the interference signal is similar to that of the desired signal and thus a reception SINR is rapidly reduced. In order to solve such a problem, the base station may perform multi user (MU)-MIMO precoding to minimize interference. However, even in this case, it is difficult to completely cancel multi-user interference due to channel information errors, aging phenomena and codebook size restriction.

In a multi-cell environment, interference among various cells is caused. Representatively, in the environment of FIG. 4, the UE A is influenced by interference from a base station B and the UE B is influenced by interference from a base station A. In particular, when a UE is close to a boundary between neighboring cells, the UE receives stronger interference from the neighboring base station. In addition, when a gap between cells is narrow as in a small cell (e.g., a micro cell, a pico cell, a femto cell, etc.), a probability that a UE receives strong interference from a neighboring cell is further increased.

In a dense multi-cell environment employing a massive MIMO method, interference cancellation capabilities of a MIMO receiver need to be improved. In particular, if strong interference is caused, an interference cancellation (IC) reception algorithm is required and an existing IC receiver requires more antennas than the number of interference sources. For example, the receiver requires 11 receive antennas in order to cancel 10 interference sources. In a small-sized UE in which a sufficient number of antennas may not be mounted, technologies for solving such a limitation need to be introduced. For example, improved interference suppression (IS) technology applies to multi-user or multi-cell interference or interference alignment technology is utilized in a transmitter to align interference in a specific signal space and an IC receiver is applied to cancel interference from many interference sources using a restricted number of receive antennas.

Figure 5:
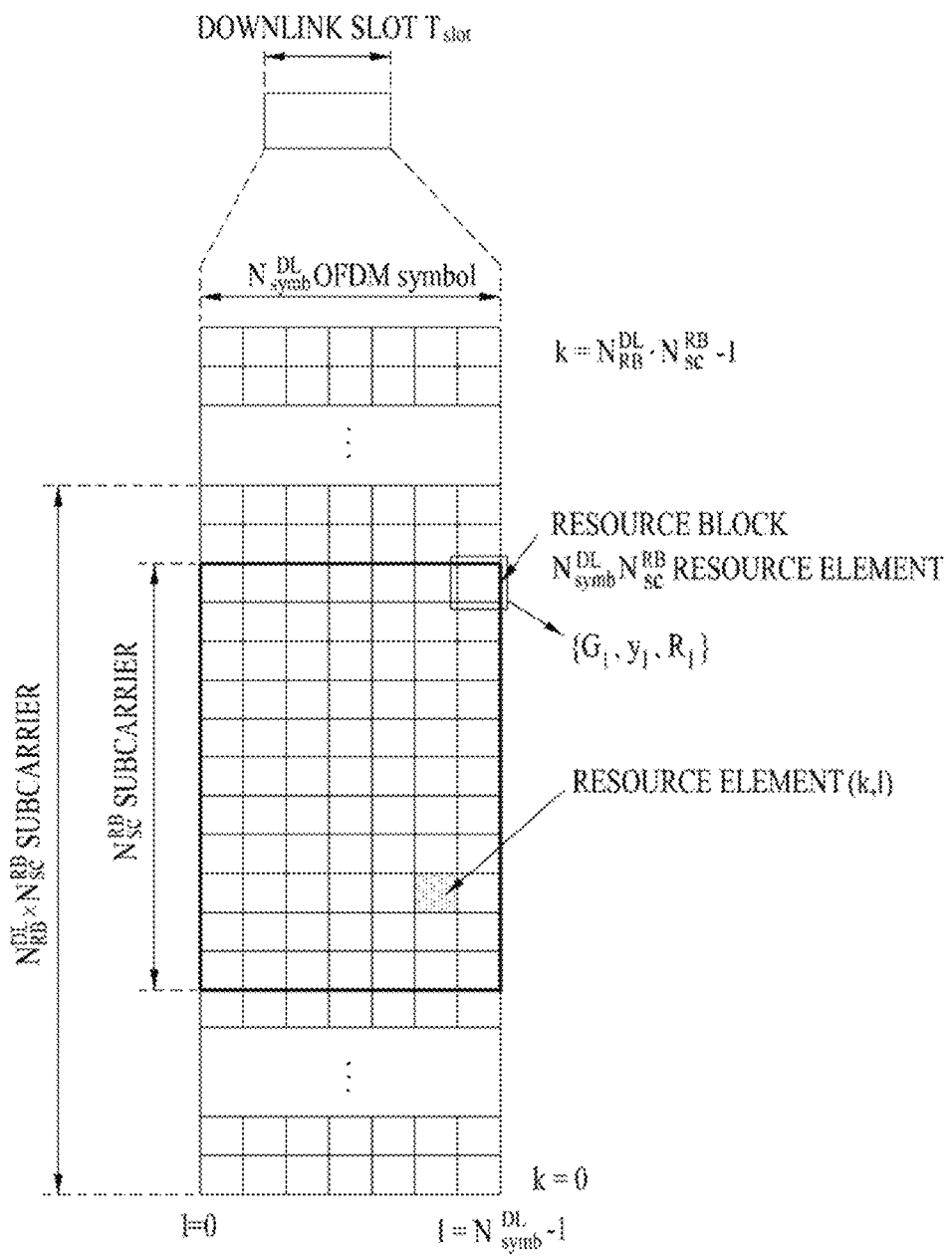
FIG. 5 is a diagram showing the structure of a resource block (RB) assigned to a UE in relation to the present invention.
Figure 6:
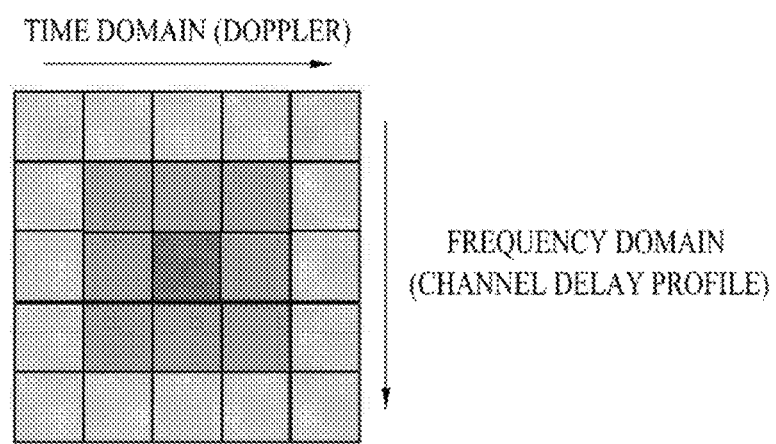
FIG. 6 is a diagram showing a resource element (RE) group formed by a plurality of REs in relation to the present invention.
Figure 7:
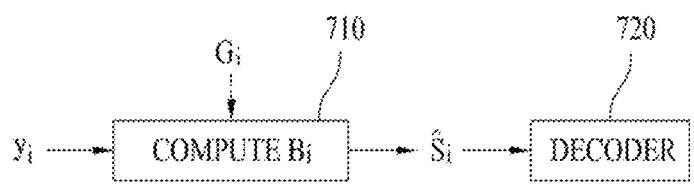
FIG. 7 is a diagram showing a conventional MIMO receiver operational process in relation to the present invention.

Subsequently, an operation algorithm of a conventional MIMO receiver will be described in relation to the above-described problems. FIG. 5 is a diagram showing the structure of a resource block (RB) assigned to a UE in relation to the present invention. FIG. 6 is a diagram showing a resource element (RE) group formed by a plurality of REs in relation to the present invention. FIG. 7 is a diagram showing a conventional MIMO receiver operational process in relation to the present invention.

FIG. 5 shows one RB assigned to a specific UE and vertical and horizontal axes respectively denote frequency and time axes. One RB is composed of $N_{SC}^{RB}N_{symb}^{DL}$ REs and, in each RE, a received signal is expressed by Equation 1 below.

$$y_l = G_l s_l + i_l + w_l, l = 0, \ldots, N_{SC}^{RB}N_{symb}^{DL} - 1 \quad \text{Equation 1}$$

In Equation 1, 1 denotes an index of an RE, $G_l$ denotes a channel estimated via a demodulation reference signal (DMRS) in a receiver, $s_l$ denotes a transmitted signal, and $I_l$ denotes interference. $w_l$ denotes white noise and a covariance matrix of $w_l$ is $\sigma_w^2 I$.

As described above, the receiver may use a minimum mean square error (MMSE) filter in order to cancel influence of a channel from a received signal. A transmitted signal detected from the received signal using the MMSE filter is expressed by Equation 2 below.

$$\hat{s}_l = B_l y_l \text{ with } B_l = (G_l^H G_l + R_l)^{-1} G_l^H \quad \text{Equation 2}$$

In Equation 2, $B_l$ denotes an MMSE filter and $\hat{s}_l$ denotes a transmitted signal estimated via the MMSE filter. A covariance matrix $R_l$ is defined as $R_l = i_l i_l^H + \sigma_w^2 I$. At this time, computational complexity of multiplication of complex numbers necessary to estimate the transmitted signal using the MMSE filter may be schematically expressed by Equation 3 below.

$$\left(\frac{1}{2}N_r N_s^2 + \frac{1}{2}N_s^3 + N_s^2 + N_r N_s\right)N_{RB}^{DL}N_{symb}^{DL} \quad \text{Equation 3}$$

In case of massive MIMO, the number $N_r$ of receive antennas is large and, in this case, streams corresponding in number $N_s$ to a maximum number of receive antennas may be received. In this case, communication capacity of the receiver may be improved by a maximum of $N_s$ times but complexity is rapidly increased in proportion to the cube $O(N_s^3)$ of the number of streams. Accordingly, if the number of received streams is large, a receiver capable of performing processing with low complexity while minimizing performance deterioration is necessary.

FIG. 6 shows a portion of an RB of FIG. 5 and shows an RE group composed of several REs. At this time, channels of the REs may have mutual correlation. In particular, if the Doppler effect is small (the receiver is slowly moved or is fixed), correlation between the REs located on the same horizontal axis is large. If power delay spread of a channel is low, correlation between the REs located on the same vertical axis is large. If the Doppler effect is small and power delay spread of the channel is low, correlation between all REs shown in FIG. 6 is large. In FIG. 6, correlation between a center RE and a peripheral RE is shown by the depth of shade. That is, as the depth of shade of each RE increases, correlation with the center RE increases and, as the depth of shade of each RE decreases, correlation with the center RE decreases.

As shown in FIG. 7, a conventional MIMO receiver has applied to the same operation to REs without considering correlation between the REs to detect a transmitted signal. That is, the conventional MIMO receiver has performed a process of computing a filter $B_l$ from channel information $G_l$ per RE with respect to a received signal (710) and detecting and decoding a received signal with respect to each RE (720). However, when taking into account increase in computational complexity and memory requirements due to increase in number of streams in a massive MIMO environment, a conventional reception algorithm needs to be improved.

Hereinafter, a MIMO receiver which operates according to an algorithm having lower complexity while providing the same performance as a conventional algorithm using correlation between REs is proposed.

1.2 Operation Algorithm of Proposed MIMO Receiver

Figure 8:
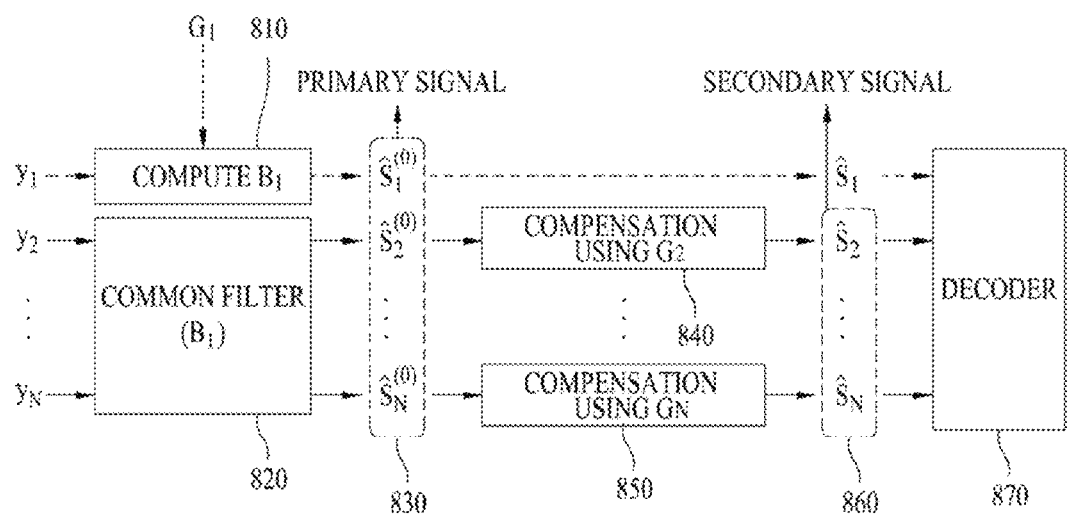
FIG. 8 is a diagram showing a MIMO receiver operational process according to one embodiment of the present invention.
Figure 9:
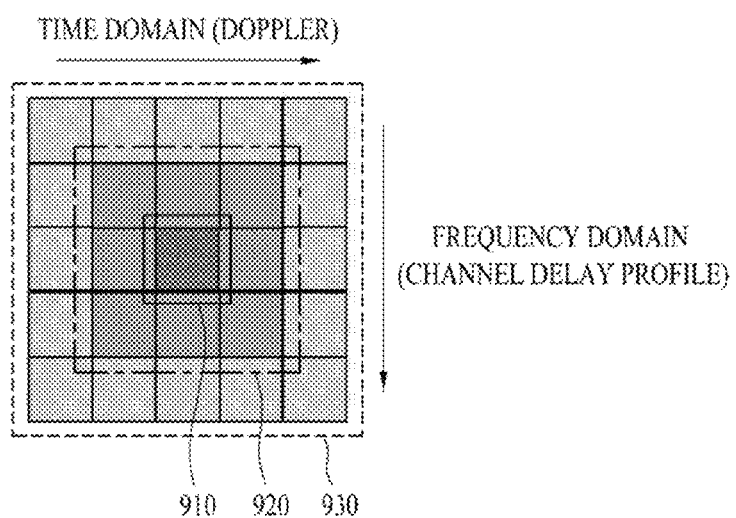
FIG. 9 is a diagram illustrating an embodiment in which the number of repetitions of a compensation process is changed according to RE within a RE group in relation to the present invention.

Hereinafter, an algorithm of a MIMO receiver which operates with lower complexity while maintaining performance is proposed with reference to FIGS. 8 and 9. FIG. 8 is a diagram showing a MIMO receiver operational process according to one embodiment of the present invention. FIG. 9 is a diagram illustrating an embodiment in which the number of repetitions of a compensation process is changed according to RE within a RE group in relation to the present invention.

In FIG. 8, $B_c$ denotes a filter generated based on a MIMO channel of a c-th RE and a signal $\hat{s}_l^{(0)}$ detected from a received signal of an 1-th RE using the filter is defined as a primary signal. A signal $\hat{s}_l$ obtained by compensating for the primary signal is defined as a secondary signal. N denotes a total number of REs belonging to an RE group including a plurality of REs and one of the N REs is selected as the c-th RE.

According to one embodiment of the present invention, a plurality of REs forms an RE group. One RE selected from the group becomes a reference RE and the reference RE may be determined regardless of order of REs in the RE group. For example, the reference RE may be an RE located at the center of the RE group on horizontal and vertical axes or an RE first located on the horizontal and vertical axes in the RE group. Hereinafter, for convenience, assume that the reference RE is a first RE of c=1. That is, $G_1$ and $B_1$ denote a channel and a reception filter of the reference RE, respectively.

First, the reception filter $B_1$ is generated based on the channel $G_1$ of the reference RE (810). The generated reception filter $B_1$ is a common filter of the RE group and is commonly applied to all REs in the RE group (820). That is, REs except for the reference RE in the RE group detect primary signals using the reception filter $B_1$ (830). A process of detecting the primary signals may be performed via an algorithm such as MMSE, zero forcing (ZF), interference rejection combining (IRC), BLAST, etc. Such detection algorithms are described in TR 36.866 for NACI v1.1.0. The reception filter $B_1$ shared in the RE group may mean the reception filter itself or a specific term configuring the reception filter.

Subsequently, the REs in the RE group compensate for the primary signals based on inherent channels thereof (840 and 850) to generate secondary signals (860). The decoder 870 decodes the generated secondary signals to restore transmitted signals.

The above-described compensation process may be performed via an algorithm such as conjugate gradient (CG), Newtonian method, steepest descent method, etc. Hereinafter, the compensation process will be described in detail with reference to FIG. 9 and an embodiment using a CG algorithm will be described.

FIG. 9 shows correlation between a center RE (reference RE) and peripheral REs in an RE group by the depth of shade. That is, as the depth of shade of the RE increases, correlation with the center RE increases and, as the depth of shade of the RE decreases, correlation with the center RE decreases. REs which are similar in terms of correlation with the reference RE in the RE group are combined to form an RE sub group. In the shown embodiment, the reference RE is denoted by 910, a first RE sub group composed of 8 REs adjacent to the reference RE and having large correlation with the reference RE is denoted by 920 and a second RE sub group composed of 16 REs distant from the reference RE and having small correlation with the reference RE is denoted by 930.

First, the receiver uses the channel $G_1$ of the reference RE 910 to obtain an MMSE filter, and such a filter becomes a common filter $B_1$ of the RE group. The primary signal of the reference RE 910 is generated via a filter generated via an inherent channel thereof and thus does not need to be compensated for. Accordingly, the primary signal of the reference RE 910 is transmitted to a decoder without being subjected to a compensation process.

Subsequently, the receiver detects the primary signals of the REs of the first RE sub group and the second RE sub group except for the reference RE using the common filter. The channels of the REs included in the first and second RE sub groups are different from the channel of the reference RE 910 and thus errors occur between the detected primary signals and the actually transmitted signals. If the channels of the REs are equal to that of the reference RE 910, an error therebetween is 0. From the inherent channels of the REs and the primary signal of the reference RE 910, Equation 4 below may be derived with respect to the secondary signals $\hat{s}_l$ of the REs.

$$\hat{s}_l = \min_{\hat{s}_l} \|y_l - G_l \tilde{s}_l\|^2 \text{ with } \tilde{s}_l = B_1 y_l \quad \text{Equation 4}$$

In Equation 4, $B_1$ denotes an MMSE filter generated based on the channel of the reference RE and $\tilde{s}_l$ denotes the primary signal of the reference RE 910 generated using $B_1$. The secondary signals $\hat{s}_l$ of the REs other than the reference RE 910 are expressed by $\hat{s}_l = B_l y_l$. At this time, according to one embodiment of the present invention, $\hat{s}_l$ is not generated using the filter $B_l$ of each RE but is derived from Equation 4 above. That is, the secondary signal $\hat{s}_l$ is generated by compensating for the primary signal $\tilde{s}_l$ generated using the common filter $B_1$ from the reference RE 910.

Equation 4 above may be solved by various algorithms such as the above-described CG algorithm A series of processes of analyzing Equation 4 via the CG algorithm to generate the secondary signals $\hat{s}_l$ may be expressed by Equation 5 below. The CG algorithm of Equation 5 is repeatedly operated until predetermined accuracy is derived and is a converging algorithm which derives a result via repetition in order to reduce errors. In addition, in Equation 5, the more accurate the primary signal $\tilde{s}_l$ is, that is, the smaller a channel difference between each RE and the reference RE is, the faster the secondary signal $\hat{s}_l$ is detected (that is, via a smaller number of repetitions).

$$\hat{s}^{(0)} = \tilde{s}_l \quad \text{Equation 5}$$
$$t = G_l^H G_l \hat{s}^{(0)} + R \hat{s}^{(0)}$$
$$b = G_l^H y_l$$
$$g^{(0)} = b - t$$
$$d^{(0)} = g^{(0)}$$
$$\text{while } \|g^{(i)}\| > \delta \|g^{(0)}\| \text{ do}$$
$$t = (g^{(i)})^\dagger g^{(i)}$$
$$t = G_l^H G_l d^{(i)} + R d^{(i)}$$
$$\alpha^{(i)} = \frac{t}{(d^{(i)})^\dagger t}$$
$$\hat{s}^{(i+1)} = \hat{s}^{(i)} + \alpha^{(i)} d^{(i)}$$
$$g^{(i+1)} = g^{(i)} - \alpha^{(i)} t$$
$$\beta^{(i+1)} = \frac{(g^{(i+1)})^\dagger g^{(i+1)}}{t}$$
$$d^{(i+1)} = g^{(i+1)} + \beta^{(i+1)} d^{(i)}$$
end while
$$\hat{s}_l = \hat{s}^{(end)}$$

In Equation 5, $\hat{s}^{(i)}$ is a transmitted signal estimated via i-th repetition of the CG algorithm. A transmitted signal (that is, an initial value) $\hat{s}^{(0)}$ of $0^{th}$ repetition is set to the primary signal $\tilde{s}_l = B_1 y_l$ generated using the common filter. $\hat{g}^{(i)}$, $\hat{d}^{(i)}$, and $b^{(i)}$ denote temporary vectors for deriving results at respective algorithms. A vector $\hat{g}^{(i)}$ is a gradient vector and denotes a fastest direction enabling a repeatedly performed algorithm to derive an accurate value. At this time, if a difference between the updated vector $g^{(i)}$ and the initially generated vector $g^{(0)}$ is less than a specific threshold, repetition of the algorithm is stopped. That is, via the magnitude of the vector $\hat{g}^{(i)}$, the error between the result obtained by directly calculating the MMSE filter and the secondary signal can be indirectly confirmed. If the value $g^{(i)}$ is 0, the difference between the secondary signal and the result obtained using the MMSE filter is 0.

In Equation 5, $\delta$ determines an end time of the algorithm and may mean target accuracy of the algorithm. $\delta$ may be automatically determined by the system or may be determined according to user input. As $\delta$ decreases, the number of repetitions of the algorithm increases and accuracy of the result increases. In contrast, $\delta$ increases, the number of repetitions of the algorithm decreases and accuracy of the result decreases.

Accordingly, an error between the secondary signal obtained by compensating for the primary signal according to the level of $\delta$ and the secondary signal directly computed via $B_l$ is determined. As a result, the correction degree $\delta$ may be adjusted to provide trade-off between computational complexity and performance. If the number of repetitions of the CG algorithm reaches the size of a square matrix, the secondary signal acquired by compensating for the primary signal becomes equal to the result directly computed via $B_l$. That is, $\hat{s}_l^{(N_s)}$ may be expressed by $\hat{s}_l^{(N_s)} = B_l y_l$.

In this regard, the receiver restricts the number of repetitions of the compensation process to restrict a maximum time required to generate the secondary signal. That is, the time required for computation repeated in the compensation process is not changed according to repetition. In addition, if the time required for a receiver to generate the secondary signal of a specific RE is significantly large, overall processing time is influenced. In order to prevent such a problem, the time required to generate the secondary signal may be restricted to a specific range by restricting the number of repetitions. However, if the primary signal is not sufficiently compensated for within the restricted number of repetitions, the error between the secondary signal obtained by compensating for the primary signal and the secondary signal obtained via the filter $B_l$ generated from the inherent channel thereof may increase to deteriorate performance.

Unlike the embodiments described with reference to FIGS. 8 and 9, with respect to REs adjacent to the reference RE in the RE group, after the primary signal is detected using the common filter, the compensation process may be omitted according to channel correlation with the reference RE. That is, with respect to REs having correlation with the reference RE greater than the threshold, the error with the primary signal is sufficiently small even when the compensation process is not performed. If it is determined that the error is small enough to ignore influence on performance deterioration, the receiver uses the primary signals of the REs as the secondary signal without compensation. That is, the primary signals may be immediately decoded, thereby further reducing computational complexity.

In FIG. 9, if correlation between the REs included in the first RE sub group 920 and the reference RE 910 is greater than the predetermined threshold, the compensation process may be omitted and the primary signals may be immediately used as the secondary signals, with respect to these REs.

Figure 10:
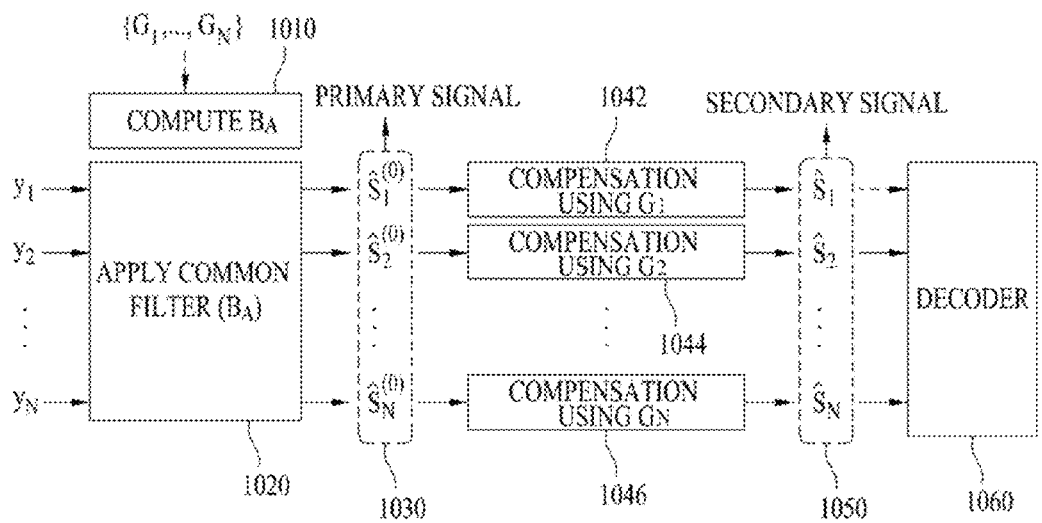
FIG. 10 is a diagram showing a MIMO receiver operational process according to another embodiment of the present invention.

FIG. 10 is a diagram showing a receiver operational process according to another embodiment of the present invention.

In FIG. 10, unlike FIGS. 8 and 9, an embodiment in which a common filter is obtained via channels of all REs in a group will be described. That is, the receiver obtains a new channel matrix $G_A$ using the channels of all the REs in the RE group. $G_A$ may be expressed by Equation 6 below.

$$G_A = \frac{1}{N}\sum_{l=1}^{N} w_l G_l \quad \text{Equation 6}$$

In Equation 6, N denotes the number of REs in the RE group. $w_l$ denotes a weight of a channel matrix of each RE. In case of $w_l=1$, $G_A$ is defined as an average of all channel matrices. $w_l$ may be differently set according to REs in the RE group. The common reception filter to be shared in the entire RE group based on the channel matrix $G_A$ is defined as shown in Equation 7 below.

$$B_A = (G_A^H G_A + R_A)^{-1} G_A^H \quad \text{Equation 7}$$

In Equation 7, $$R_A = \frac{1}{N}\sum_{l=1}^{N} w_l' R_l$$

is defined, $R_l$ denotes a covariance matrix of each RE and $w_l'$ denotes a weight of $R_l$.

That is, in the embodiment of FIG. 10, the common filter $B_A$ is computed based on the channels of all the REs (1010) and the primary signals of the all the REs signal in the RE group are generated using the common filter (1020 and 1030). Subsequently, secondary signals are generated (1050) by compensating for the primary signals (1042, 1044 and 1046) and are transmitted to the decoder (1060). The embodiment shown in FIG. 10 is different from the embodiments of FIGS. 8 and 9 in that the reception filter of the reference RE is used as the common filter and thus the compensation process of the reference RE does not need to be performed in FIGS. 8 and 9. However, in the embodiment of FIG. 10, the compensation process of the reference RE is performed (1042).

Figure 11:
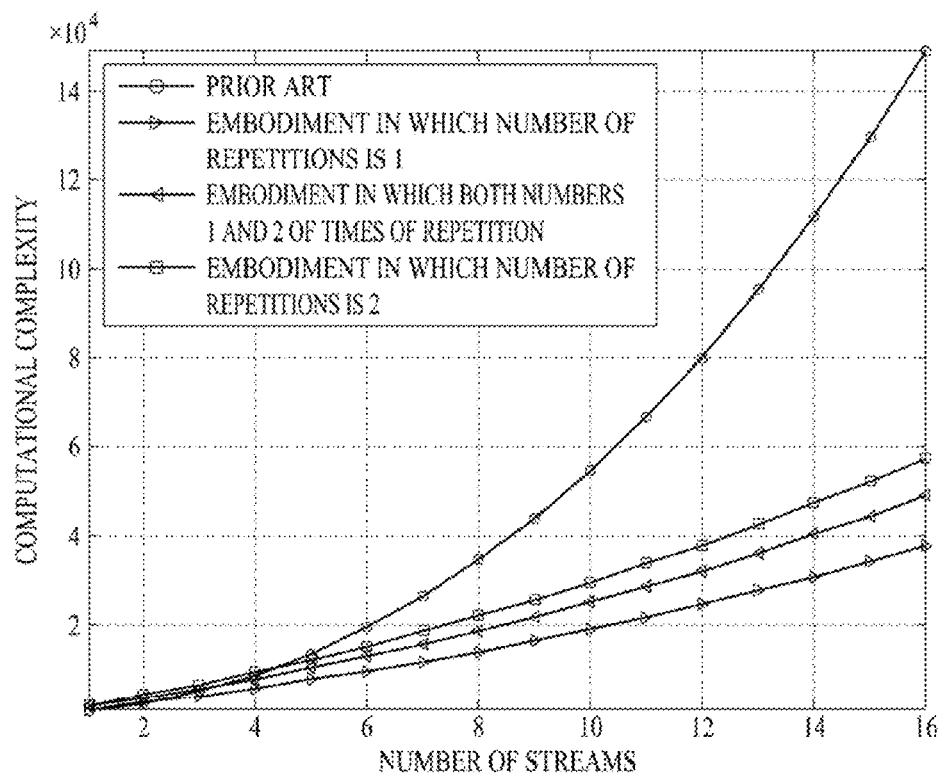
FIG. 11 is a graph for comparison in computational complexity between the prior art and embodiments of the present invention.

FIG. 11 is a graph for comparison in computational complexity between the prior art and embodiments of the present invention.

FIG. 11 shows the graph for comparison between computational complexity when the REs shown in FIG. 9 are solved using the conventional receiver operation algorithm described with reference to FIG. 7 and computational complexity when the REs shown in FIG. 9 are solved using the operation algorithms of the proposed embodiments. FIG. 11 shows computational complexity in three cases of the number of repetitions of the compensation process. If the numbers 1 and 2 of times of repetition are simultaneously applied, the compensation process is repeated once with respect to the REs of the first RE sub group 920 and the compensation process is repeated twice with respect to the REs of the second RE sub group 930 in FIG. 9. As shown, the receiver operation algorithm according to the proposed embodiment can obtain more gain in terms of computational complexity as compared to the prior art as the number of received streams is increased.

In the above-proposed receiver operation algorithm, the filter $B_1$ computed with respect to the reference RE in the RE group is shared among all the REs. If correlation between all the REs and the reference RE is 1, all $B_l$ become equal to $B_1$ and the compensation process of the primary signals computed via $B_1$ is omitted. Accordingly, since the reception filter of only one reference RE is computed with respect to the RE group including 5×5=25 REs, implementation complexity of the reception filter is reduced to $\frac{1}{25}$ that of the prior art.

If correlation is less than 1, an error between the primary signal estimated using the common filter $B_c$ and the signal obtained via $B_l$ occurs. At this time, since correlation with the reference RE is inversely proportional to the error of the primary signal, the number of repetitions and time required to perform the compensation process for acquiring the secondary signal are reduced. As a result, the proposed receiver operation algorithm may use correlation between REs to reduce computational complexity while minimizing performance deterioration.

In addition, by restricting the number of repetitions of the compensation process, the error of the secondary signal in an allowable range may be allowed to reduce complexity. Accordingly, the proposed receiver operation algorithm may control trade-off between computational complexity and performance in consideration of a communication environment and an SNR region.

In addition, an inverse matrix computation process is performed with respect to the reference RE only, thereby reducing memory requirements necessary for inverse matrix computation. That is, since all operations except for the inverse matrix computation process of the reference RE are performed via the operation of the matrix X vector, parallelism is very easy. Therefore, a distribution scheme is easily applied to significantly reduce overall processing time.

1.3 RE Group Setting Method in Proposed MIMO Receiver

Hereinafter, two embodiments of setting an RE group such that a MIMO receiver operates according to the above-proposed reception algorithm will be described. A first embodiment will be described with reference to FIGS. 12 and 13 and a second embodiment will be described with reference to FIGS. 14 and 15. Although a detailed description is omitted, the embodiments described in 1.2 are similarly applicable.

In the first embodiment, the receiver sets a specific RE as a reference RE among all REs and generates a reception filter (that is, a common filter) of the reference RE based on channel information of the reference RE (1210). Subsequently, the common filter is applied to a most adjacent RE of the reference RE (1220). This embodiment is different from the above-described embodiment in that the RE group is not predetermined in the embodiment of FIG. 12. That is, the common filter is not applied to the REs in the RE group but is applied to an RE adjacent to the reference RE.

The specific RE adjacent to the reference RE means that the specific RE is located closest to the reference RE on the RB in the time or frequency axis direction. If an RE is located at a location closest to the reference RE in the time or frequency axis direction (e.g., a boundary of the RB, etc.), an RE having a smallest distance physically separated from the reference RE on the time and frequency axes becomes an RE adjacent to the reference RE. In general, correlation between adjacent REs is high.

Figure 12:
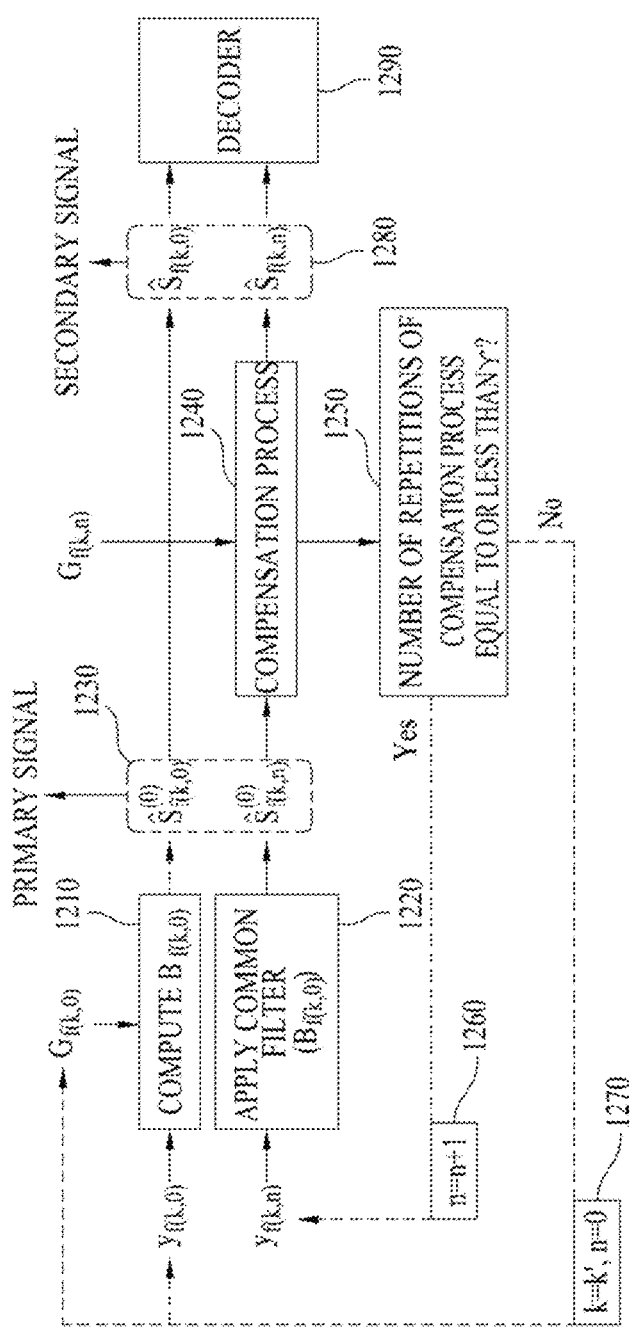
FIG. 12 is a diagram showing a MIMO receiver operational process according to another embodiment of the present invention.

First, in parameters of FIG. 12, f(k,0) denotes the location of the reference RE of a k-th RE group. f(k,n) denotes the location of an n-th selected RE from among REs adjacent to the reference RE in the RE group. That is, n may mean the order of REs processed in one RE group. $B_{f(i,0)}$ denotes a common filter generated based on the reference RE of an i-th RE group.

The receiver applies the common filter $B_{f(k,0)}$ to the reference RE and the RE f(k,n) adjacent to the reference RE to generate primary signals $\tilde{s}_{f(k,n)}^{(0)}$ (1230). The primary signal of the reference RE is obtained by applying the filter generated using channel information thereof and thus is an accurate value without error. Thus, the primary signal of the reference RE becomes a secondary signal (1280). In contrast, in the primary signal of the RE adjacent to the reference RE, an error occurs according to correlation with the reference RE. As in the above-described embodiment, the receiver compensates for the primary signals (1240) to generate secondary signals $\hat{s}_{f(k,n)}$ (1280). If compensation is sufficiently performed, the secondary signals $\hat{s}_{f(k,n)}$ become $B_{f(k,n)}y_{f(k,n)}$ computed using the channel information of the REs.

A detailed process of the compensation process is similar to the above description of FIGS. 8 and 9. That is, the MMSE/ZF/IRC/BLAST filter may be used as the common filter in order to generate the primary signals and the compensation process for generating the secondary signals may use the CG/Newtonian method/steepest descent method algorithm. In addition, such algorithms may be repeatedly performed until the compensation result (that is, the error with the directly computed secondary signal) is within a predetermined range.

The compensation process for compensating for the primary signals may be implemented to satisfy Equation 8 below.

$$\hat{s}_{f(k,n)} = \min_{\tilde{s}_{f(k,n)}} \|y_{f(k,n)} - G_{f(k,n)}\tilde{s}_{f(k,n)}\|^2 \text{ with} \quad \text{Equation 8}$$

$$\tilde{s}_{f(k,n)} = B_{f(k,n)}y_{f(k,n)}$$

In Equation 8, $\tilde{s}_{f(k,n)}$ denotes the primary signal obtained using the common filter. $\hat{s}_{f(k,n)}$ is defined as $\hat{s}_{f(k,n)} = B_{f(k,n)}y_{f(k,n)}$ and denotes signal directly computed via the MMSE filter $B_{f(k,n)}$ obtained using channel information thereof instead of the common filter. The compensation process means a repeated process of finding $\hat{s}_{f(k,n)}$ without using $B_{f(k,n)}$ in Equation 8 and Equation 9 is obtained, for example, when using the CG algorithm as in the above-described embodiment.

$$\hat{s}^{(0)} = \tilde{s}_{f(k,n)} = B_{f(k,0)}y_{f(k,n)} \quad \text{Equation 9}$$

$$t = G_{f(k,n)}^H G_{f(k,n)}\hat{s}^{(0)} + R\hat{s}^{(0)}$$

$$b = G_{f(k,n)}^H y_{f(k,n)}$$

$$g^{(0)} = b - t$$

$$d^{(0)} = g^{(0)}$$

while $\|g^{(i)}\| > \delta\|g^{(0)}\|$ do $$t = (g^{(i)})^\dagger g^{(i)}$$

$$t = G_{f(k,n)}^H G_{f(k,n)}d^{(i)} + Rd^{(i)}$$

$$\alpha^{(i)} = \frac{t}{(d^{(i)})^\dagger t}$$

$$\hat{s}^{(i+1)} = \hat{s}^{(i)} + \alpha^{(i)}d^{(i)}$$

$$g^{(i+1)} = g^{(i)} - \alpha^{(i)}t$$

$$\beta^{(i+1)} = \frac{(g^{(i+1)})^\dagger g^{(i+1)}}{t}$$

$$d^{(i+1)} = g^{(i+1)} + \beta^{(i+1)}d^{(i)}$$

end while $$\hat{s}_{f(k,n)} = \hat{s}^{(end)}$$

In Equation 9, $\hat{s}^{(i)}$ denotes a transmitted signal estimated at i-th repetition. A transmitted signal (initial value) at $0^{th}$ repetition is set to a primary signal $\tilde{s}_{f(k,n)} = B_{f(k,0)}y_{f(k,n)}$. $\hat{g}^{(i)}$, $\hat{d}^{(i)}$, and $b^{(i)}$ denote temporary vectors for obtaining solutions. A vector $\hat{g}^{(i)}$ is a gradient vector and denotes a fastest direction enabling a repeatedly performed algorithm to derive an accurate value. At this time, if a difference between the updated vector $g^{(i)}$ and the initially generated vector $g^{(0)}$ is less than a specific threshold, repetition of the algorithm is stopped. That is, via the magnitude of the vector $\hat{g}^{(i)}$, the result obtained by directly calculating the MMSE filter and the error with the secondary signal can be indirectly confirmed. If the value $g^{(i)}$ is 0, the difference between the secondary signal and the result obtained using the MMSE filter is 0.

In Equation 9, $\delta$ determines an end time of the algorithm and may mean target accuracy of the algorithm $\delta$ may be automatically determined by the system or may be determined according to user input. As $\delta$ decreases, the number of repetitions of the algorithm increases and accuracy of the result increases. In contrast, $\delta$ increases, the number of repetitions of the algorithm decreases and accuracy of the result decreases.

Accordingly, an error between the secondary signal obtained by compensating for the primary signal according to the level of $\delta$ and the secondary signal directly computed via $B_{f(k,n)}$ is determined. As a result, the correction degree $\delta$ may be adjusted to provide trade-off between computational complexity and performance. If the number of repetitions of the CG algorithm reaches the size of a square matrix, the secondary signal acquired by compensating for the primary signal becomes equal to the result directly computed via $B_{f(k,n)}$. That is, $\hat{s}_{f(k,n)}^{(N_s)}$ may be expressed by $B_{f(k,n)}y_{f(k,n)}$.

The receiver may pre-set a threshold γ of the number of repetitions in the process of compensating for the RE adjacent to the reference RE. Subsequently, a determination is made as to whether the number of repetitions performed in order to generate the secondary signal of the RE is equal to or less than the threshold (1250). The number of repetitions being equal to or less than the threshold means that an error between the signal obtained by compensating for the primary signal via the proposed scheme and the result obtained using the MMSE filter directly calculated based on the actual channel thereof is not large, that is, that correlation with the reference RE is sufficiently large. In contrast, the number of repetitions exceeding the threshold means that correlation between the RE and the reference RE is small and thus the primary signal cannot be compensated for within a target range by the predetermined number of repetitions only.

Accordingly, if the number of repetitions is equal to or less than the threshold, the RE next to the RE subjected to the compensation process is selected (1260) and the next RE may mean an RE secondly adjacent to the reference RE. Subsequently, the common filter is applied to generate the primary signal and the primary signal is compensated for to generate the secondary signal. This process is performed until the number of repetitions of the process of compensating for the primary signal of a specific RE exceeds the threshold.

As described above, the number of repetitions of the specific RE exceeding the threshold means that correlation between the specific RE and the reference RE is small. In other words, when the common filter generated using the channel information of the reference RE is applied without change, the error may be significantly large. Accordingly, a process of setting a new reference RE and generating a new common filter is performed (1270).

The receiver sets REs, which may be compensated for in a predetermined number of repetitions even when the common filter of the reference RE is applied, as one RE group and applies the common filter to the RE group without change. However, if the number of repetitions exceeds the threshold, a new reference RE is set and a new common filter is generated. That is, unlike the embodiments of FIGS. 8 and 9, the RE group is not predetermined and an area using the common filter is determined according to the number of repetitions of the compensation process for generating the secondary signal. From the viewpoint of the RE group, the RE group is adaptively determined even when correlation with the reference RE is not known.

Figure 13:
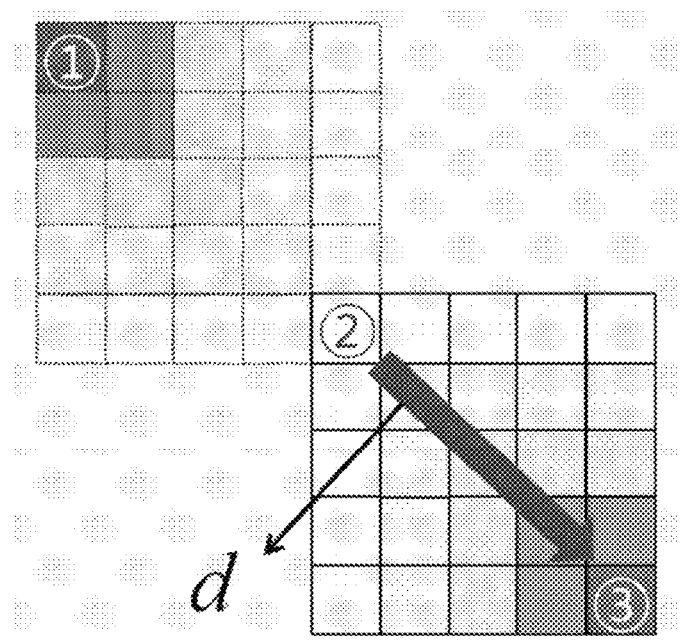
FIG. 13 is a diagram illustrating a process of forming an RE group according to one embodiment of the present invention.

FIG. 13 is a diagram illustrating an embodiment of setting a new reference RE. That is, assume that the number of repetitions of the compensation process exceeds the threshold at a second RE in the process of sharing a common filter of a first RE among REs to generate the secondary signal. The common filter of the first RE as the reference RE is discarded. A third RE selected as a new reference RE may be located at a location separated by a distance from the reference RE (the first RE) to the RE where the common filter is discarded (the second RE).

Unlike the shown embodiment, the new reference RE may be selected according to various criteria in the RB. For example, an RE separated from a previous reference RE by a predetermined distance on the frequency or time axis direction may be selected and an arbitrary RE in the RB may be selected.

Figure 14:
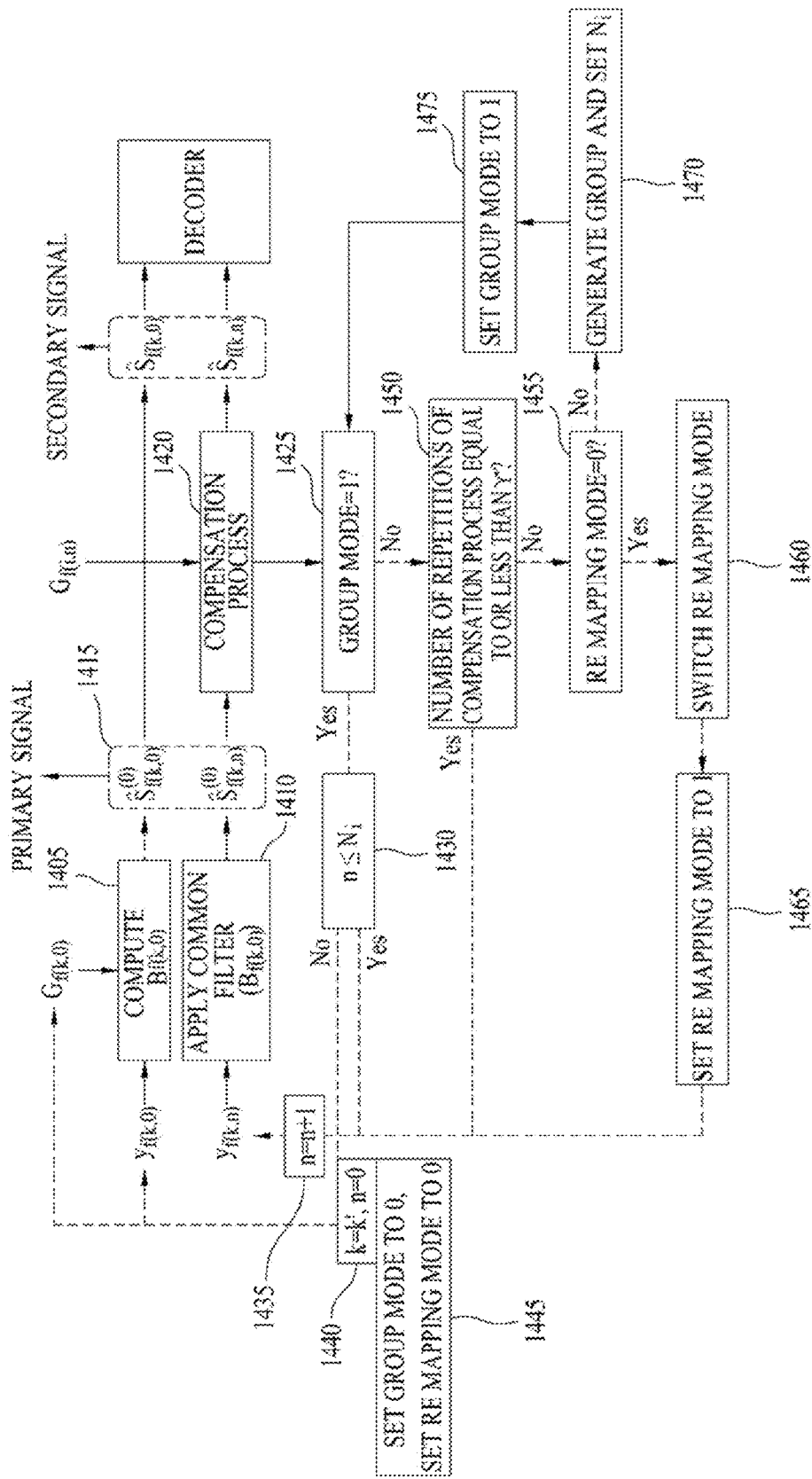
FIG. 14 is a diagram showing a MIMO receiver operational process according to another embodiment of the present invention.
Figure 15:
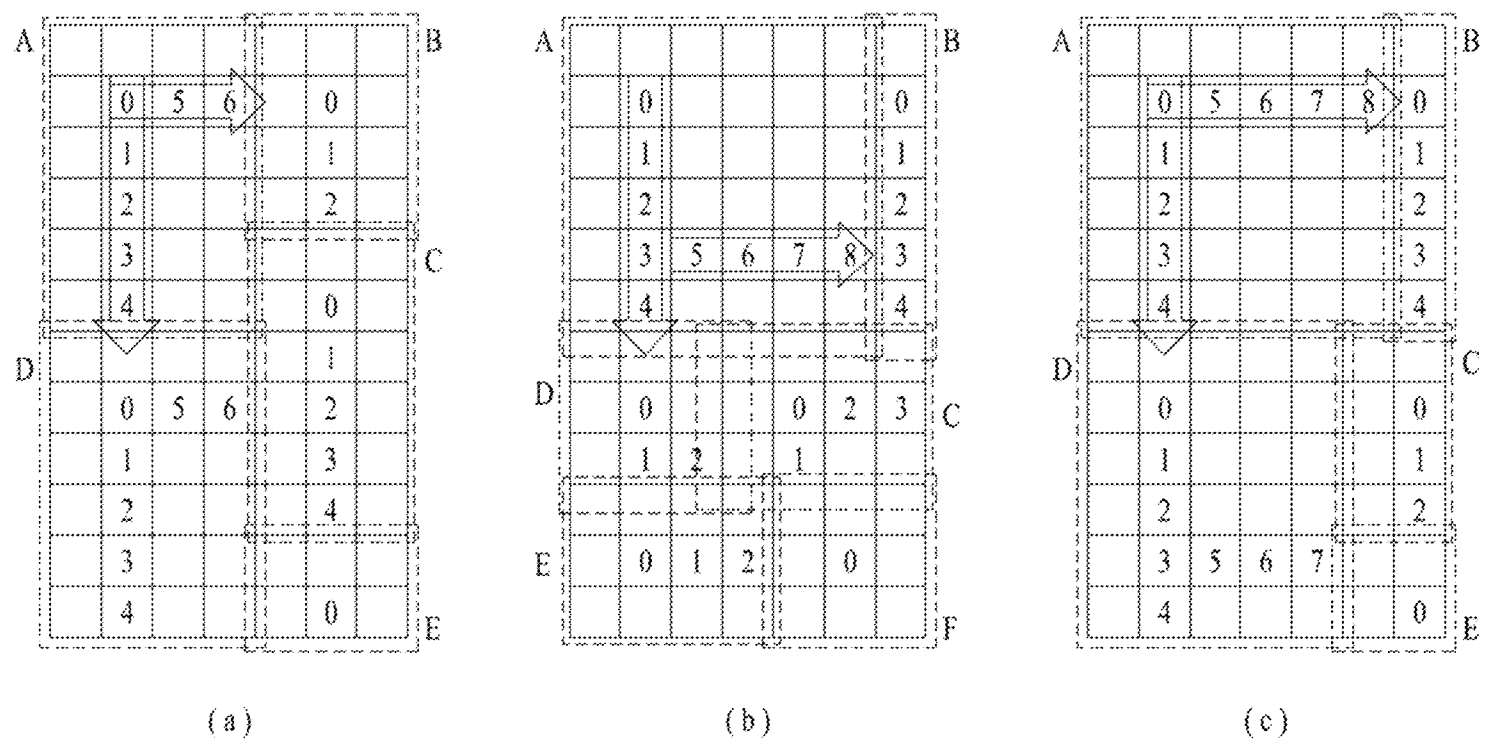

Subsequently, the second embodiment of setting an RE group will be described with reference to FIGS. 14 and 15. FIG. 14 is a diagram showing a MIMO receiver operational process according to another embodiment of the present invention. FIG. 15 is a diagram illustrating a process of forming an RE group according to one embodiment of the present invention. In FIG. 14, n denotes the order of processing, not an index number of a specific RE. k denotes the order of RE groups processed in the RB (k=A, B, C, . . . ).

In FIG. 14, processes 1405 to 1420 are similar to 1210 to 1240 of FIG. 12. That is, the receiver generates a common filter from channel information of a reference RE and applies the common filter to the reference RE and an RE adjacent to the reference RE to generate primary signals. The primary signal of the reference RE becomes a secondary signal without compensation and the primary signals of the RE other than the reference RE are subjected to the compensation algorithm to generate secondary signals.

In the embodiment of FIG. 14, REs adjacent to the reference RE on the frequency axis direction are sequentially selected as the RE to which the common filter is applied. Selection progresses along the frequency axis direction and, if the number of repetitions exceeds the threshold at a specific RE while generating the secondary signal, REs adjacent to the reference RE on the time axis direction are sequentially selected as the next RE. Subsequently, if the number of repetitions exceeds the threshold at a specific RE while selection progresses along the time axis direction, the RE is no longer selected. Instead, a rectangle having a last RE in the frequency axis direction and a last RE in the time axis direction as a border becomes one RE group. A first RE at which the number of repetitions of the compensation process of the primary signal exceeds the threshold while selection progresses starting from the reference RE along the frequency and time axis direction is referred to as a "border RE". In the process of forming the RE group, two border REs are selected according to progress in the frequency and time axis directions and respectively become a "first border RE" and a "second border RE". Unlike the above description, selection may first progress along the time axis direction and then progress along the frequency axis direction.

With respect to all the REs in the determined RE group, primary and secondary signals are generated using the common filter of the reference RE. When selection progresses along the frequency/time axis direction, the secondary signals do not need to be generated for the REs for which the secondary signals have been generated. If generation of the secondary signals in the RE group is completed, the above process is repeated using the RE adjacent to the RE group as a new reference RE.

Referring to FIG. 14, when the compensation process of an n-th RE is performed (1420), the receiver determines whether a group mode is currently 1 (1425). The group mode indicates whether progress starting from the reference RE in the frequency or time axis direction is completed (that is, the process of forming the RE group is performed) or whether a process of generating secondary signals of the REs in the group is performed after the RE group has been formed. Group mode 0 indicates that the RE group is not yet formed and thus REs are sequentially selected starting from the reference RE in a predetermined direction. In contrast, Group mode 1 indicates that borders in the frequency and time axis directions have been formed to select the RE group.

If the group mode is 0 because the RE group is not yet formed, the receiver determines whether the number of repetitions of the compensation process is equal to or less than the threshold in the process of generating the secondary signal of the n-th RE (1450). If so, since correlation with the reference RE is sufficiently large, the common filter is applicable to the n-th RE. Accordingly, a process of selecting a next RE (1435) and generating a secondary signal for the next RE is performed.

If the number of repetitions exceeds the threshold, the first border RE is selected and the receiver checks an RE mapping mode (1455). The RE mapping mode indicates whether the process of selecting REs adjacent to the reference RE processes along the frequency axis direction or the time axis direction. The RE mapping mode may be 0 or 1, which respectively mean the frequency axis direction and the time axis direction. In the present embodiment, RE mapping mode 0 means that the selection process progresses along the frequency axis direction.

Subsequently, the receiver switches the RE mapping mode (1465). That is, since the number of repetitions for generating the secondary signal of the n-th RE exceeds the threshold, it is difficult to apply the common filter. Accordingly, the receiver stops the selection process progressing along the frequency axis direction and switches the RE mapping mode to select the REs starting from the reference RE along the time axis direction.

The receiver performs a process of selecting an (n+1)-th RE adjacent to the reference RE in the time axis direction (1435) and generating a secondary signal. Subsequently, if the number of repetitions of the compensation process exceeds the threshold at an arbitrary RE while the selection process progresses along the time axis direction (1450), the RE becomes the second border RE and the receiver checks the RE mapping mode again (1455). Since the RE mapping mode is 1 according to progress in the time axis direction, the receiver may confirm that the border of the time axis direction is set in addition to the border of the frequency axis direction. The receiver selects a rectangle formed by the two border REs as an RE group (1470) and sets the group mode to 1 (1475). The number of REs in the group is $N_i$.

Subsequently, since the group mode is currently 1 (1425), the receiver generates the secondary signals of all the REs in the RE group. That is, the receiver checks whether the number of REs for which the secondary signals are generated reaches a maximum number of REs in the RE group (1430) and, if not, repeats a process of selecting another RE in the RE group and generating a secondary signal (1435). That is, the receiver performs a process of applying the common filter of the selected reference RE to all the REs in the RE group. If the process of generating the secondary signals of all the REs is completed, the receiver selects a new reference RE (1440) and resets the group mode and the RE mapping mode (1445). Subsequently, the receiver repeats the process of selecting the REs adjacent to the reference RE along the frequency or time axis direction and generating the secondary signals.

The above-described process of setting the RE group will be described with reference to FIG. 15. First, FIG. 15(*a*) shows the process of forming the RE group according to the embodiment described with reference to FIG. 14. In a box A of FIG. 15(*a*), a $0^{th}$ RE is selected as a reference RE, a selection process progresses along a vertical axis (that is, frequency axis) direction, and secondary signals are generated. If the number of repetitions of the compensation process of the secondary signal exceeds the threshold at a fourth RE, the receiver sets the fourth RE as a vertical axis direction border and no longer performs selection. Subsequently, the receiver performs selection from a $0^{th}$ RE along a horizontal axis (that is, time axis) direction and generates secondary signals. If the number of repetitions of the compensation process exceeds the threshold at a sixth RE, the sixth RE becomes a horizontal axis direction border.

Subsequently, the receiver forms an RE group using the fourth and sixth REs as borders and applies the reception filter of the $0^{th}$ filter to all the REs in the box A as a common filter, thereby generating the secondary signals. Further, if process of the box A is completed, the receiver sets a new RE ($0^{th}$ RE of a box B) adjacent to the box A as a new reference RE and repeats the above process. Since the box B is adjacent to the border of the RB in the time axis direction, the RE group is immediately formed if selection progressing along the frequency axis direction is completed. The above process is similarly repeated with respect to boxes C and D.

As a first reference RE of the box A, a left uppermost RE of the RB is not selected but an RE separated from the border by 1 is selected, because a probability that correlation between the reference RE and REs adjacent to the reference RE is large is very high. That is, at REs adjacent to the $0^{th}$ RE and located at the RB border in the box A, a probability that the number of repetitions of the compensation process of the secondary signal is less than the threshold is very high. Accordingly, the receiver may select the RE separated from a vertex by 1 in the horizontal/vertical axis direction as the reference RE in order to simplify the process of forming the RE group.

FIG. 15(*b*) is similar to FIG. 15(*a*) but is different therefrom in a method of switching an RE mapping mode. That is, in the box A of FIG. 15(*b*), when the fourth RE is confirmed as a vertical axis direction border, selection does not progress starting from the $0^{th}$ RE in the horizontal axis direction but progresses starting from the third RE. This is merely an implementation difference. Since the number of repetitions of the compensation process exceeds the threshold at the fourth RE, if selection progresses starting from the fourth RE in the horizontal axis direction, a probability that the number of repetitions of the compensation process exceeds the threshold at fifth to eighth REs is high. Accordingly, the receiver repeats a process of performing selection starting from the third RE in the horizontal axis direction and generating the secondary signals.

FIG. 15(*c*) shows a combination of FIG. 15(*a*) and FIG. 15(*b*). That is, the embodiment of FIG. 15(*a*) is applied to the box A and the RE mapping mode is changed based on the $0^{th}$ RE. In contrast, the embodiment of FIG. 15(*b*) is applied to the box D and the RE mapping mode is changed based on the third RE.

Figure 16:
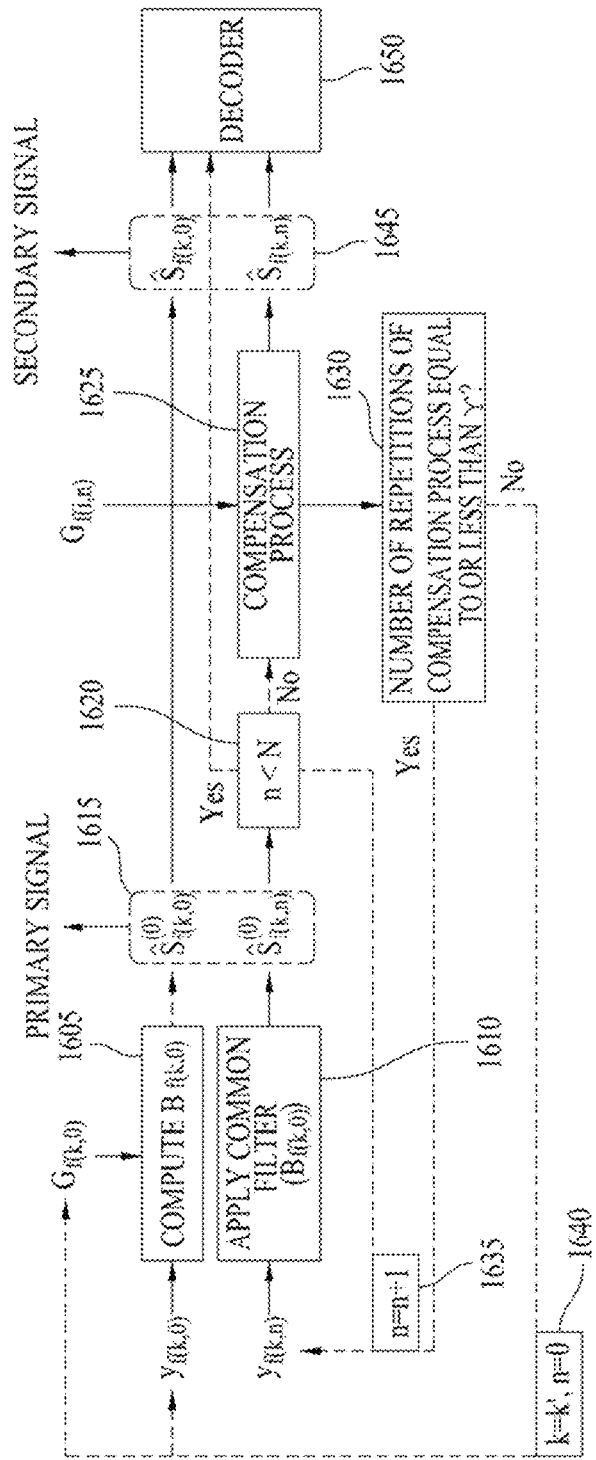
FIG. 16 is a diagram showing a MIMO receiver operational process according to another embodiment of the present invention.

FIG. 16 is a diagram showing a MIMO receiver operational process according to another embodiment of the present invention. FIG. 16 shows an embodiment partially modified from the embodiment of FIG. 14.

For REs adjacent to a reference RE, a process of compensating for a primary signal according to channel correlation with the reference RE may be omitted. That is, in REs having correlation with the reference RE greater than a threshold, the error of the primary signals is sufficiently small even when the compensation process is not performed. If it is determined that the error is small enough to ignore influence on performance deterioration, the receiver uses the primary signals of the REs as secondary signals without compensation. That is, the primary signals are immediately decoded, thereby further reducing computational complexity.

Unlike FIG. 14, in FIG. 16, n denotes the order of adjacency of a specific RE to a reference RE. That is, n may denote a distance from the reference RE in a horizontal or vertical axis direction. In addition, N is a threshold for the number of REs for which the compensation process will be omitted. That is, if N is set to 9, a process of compensating for the primary signals to obtain the second signals is omitted with respect to 8 REs (that is, n=1, 2, 3, ..., 8) adjacent to the reference RE in all directions.

In FIG. 16, processes 1605 to 1615 are equal/similar to the processes of FIG. 14. The receiver applies a common filter to check whether n is less than the threshold N with respect to an n-th RE for which the primary signal is generated (1620). For REs, the order of processing of which is less than N, the compensation process is omitted and the primary signals are immediately input to the decoder (1650). In contrast, if the order of processing is equal to or greater than N, the compensation process is performed to generate the secondary signals (1625) and a determination as to whether the number of repetitions of the compensation process is within a threshold range is made (1630). This process is repeated (1635) and a new reference RE is selected with respect to REs outside the threshold range (1640). Subsequently, a process of determining whether the compensation process is omitted is repeated at the RE adjacent to the reference RE.

Figure 17:
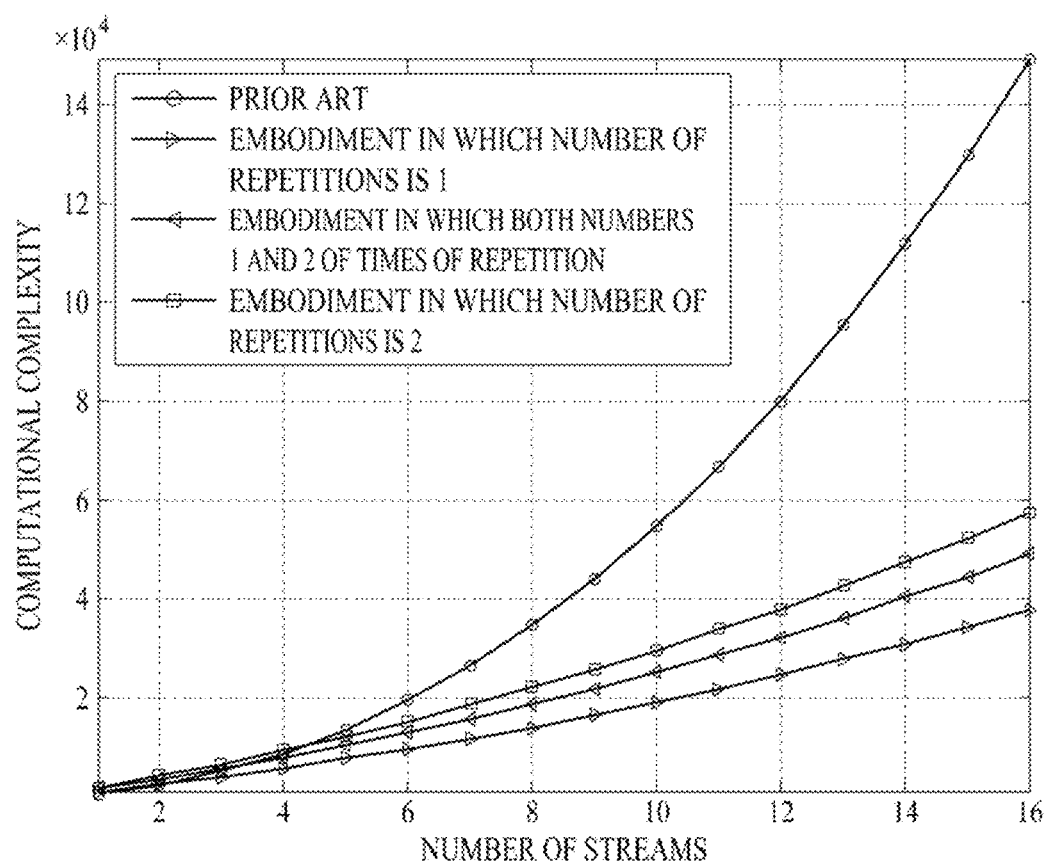
FIG. 17 is a graph for comparison in computational complexity between the prior art and embodiments of the present invention.

FIG. 17 is a graph for comparison in computational complexity between the prior art and embodiments of the present invention.

The MIMO receiver described in this section is most advantageous in that an area for sharing a common filter (an RE group) may not be predetermined. Since the receiver does not need to know channel correlation between REs in order to determine the size of each RE group, implementation complexity is reduced. That is, FIGS. 12 and 13 show the embodiment in which, if a specific RE is a border RE in a process of forming an RE group, a new RE group is formed by jumping to another RE. FIGS. 14 and 15 show the embodiment in which an RE group is formed via a border according to progress in the frequency/time axis direction.

As a result, in the proposed receiver, by adaptively setting the RE group according to channel correlation between REs without additional complexity, it is possible to minimize complexity while maintaining performance. In addition, various advantages described with reference to FIG. 11 are similarly obtained by this RE group setting method.

2. Massive MIMO Transmitter 2.1 General MIMO Transmitter

A heterogeneous cellular network (HetNet) is defined by one macro cell and a plurality of small cells. A macro cell base station serves to support UEs located in a range which is not covered by the small cells. Accordingly, the macro cell base station should simultaneously provide services to a large number of UEs.

Theoretically, under the condition that UEs receive a single stream, a base station can provide services to UEs corresponding in number to the number of antennas thereof. Thus, assume that the macro cell base station is a massive MIMO base station having a large number (M) of antennas. At this time, if one base station simultaneously supports K UEs, the number of receive antennas is K from the viewpoint of the base station and channels between the base station and the UEs may be expressed by an M×K matrix.

Representative examples of a precoding method selected for a base station to provide services to UEs include a maximum ratio transmission (MRT) scheme and a zero forcing (ZF) scheme. In the MRT scheme, complexity is low but interference with the UE is caused. Thus, performance is reduced at a receiver. In contrast, in the ZF scheme, interference with the UE is not caused but, if the number of antennas is increased, complexity is rapidly increased. If the number of antennas is infinite, the interference problem which is the drawback of the MRT scheme disappears and the same performance as the ZF scheme is obtained. However, if the number of antennas is finite, the ZF scheme has better performance than that of the MRT scheme. Accordingly, in the massive MIMO environment, there is a need for a new transmitter precoding scheme having lower complexity while having performance similar to that of the conventional ZF scheme.

Figure 18:
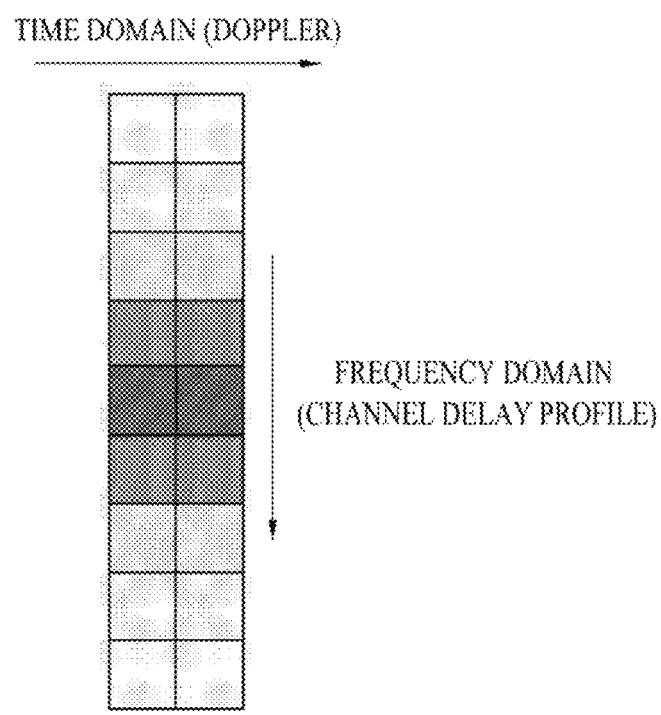
FIG. 18 is a diagram showing an RE group formed by a plurality of REs in relation to the present invention.
Figure 19:
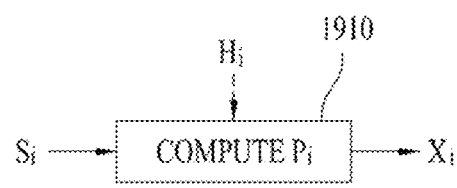
FIG. 19 is a diagram showing a conventional MIMO precoder operational process in relation to the present invention.

Next, an operation algorithm of a conventional MIMO transmitter will be described with reference to the above-described problems. FIG. 18 is a diagram showing an RE group formed by a plurality of REs, in relation to the present invention. FIG. 19 is a diagram showing a conventional MIMO precoder operational process in relation to the present invention.

FIG. 18 shows a portion of an RB of FIG. 5 and shows an RE group composed of a plurality of REs. In FIG. 18, vertical and horizontal axes denote frequency and time axes, respectively. Similarly to the above description of the receiver operation algorithm, the channels of the REs in the RE group may have mutual correlation. As the depth of shade of each RE increases, correlation with the center RE increases and, as the depth of shade of each RE decreases, correlation with the center RE decreases.

As shown in FIG. 19, in a conventional MIMO transmitter, a precoder is computed and generated for each RE without considering correlation between REs (1910). That is, when a MIMO channel of an l-th RE in an RB is defined as $H_l$, transmitted data $s_l$ of each RE is precoded and transmitted as shown in Equation 10 below.

$$x_l = \tilde{P}_l s_l \qquad \text{Equation 10}$$

In the MRT scheme, in Equation 10, a precoding matrix $\tilde{P}_l$ is $\tilde{P}_l = H_l^\dagger$. In contrast, in a regularized ZF scheme, $\tilde{P}_l$ is $\tilde{P}_l = H_l^\dagger (H_l H_l^\dagger + \Gamma_l)^{-1}$ and $\Gamma_l$ is a regularized term. In case of $\Gamma_l = 0$, a precoding matrix according to the regularized ZF scheme becomes a normal ZF precoding matrix. If the regularized ZF scheme is used, computational complexity necessary to compute the precoding matrix is approximately expressed by Equation 11 below.

$$\left( \frac{1}{2} N_t N_s^2 + \frac{1}{2} N_s^3 + N_s^2 + N_t N_s \right) N_{RB}^{DL} N_{symb}^{DL} \qquad \text{Equation 11}$$

A MIMO transmitter may transmit streams corresponding in number to a maximum number of transmit antennas ($N_s = N_t$) to a plurality of UEs. Accordingly, system throughput is linearly increased in proportion to the number of antennas of the base station but complexity is rapidly increased in proportion to the cube $O(N_s^3)$ of the number of streams. Accordingly, if the number of transmitted streams is large, a complexity problem occurs in the above-described precoding scheme.

Hereinafter, an operation algorithm of a MIMO transmitter which operates with lower complexity while providing the same performance as a conventional algorithm using correlation between REs in an RE group will be proposed.

2.2 Operation Algorithm of Proposed MIMO Transmitter

Figure 20:
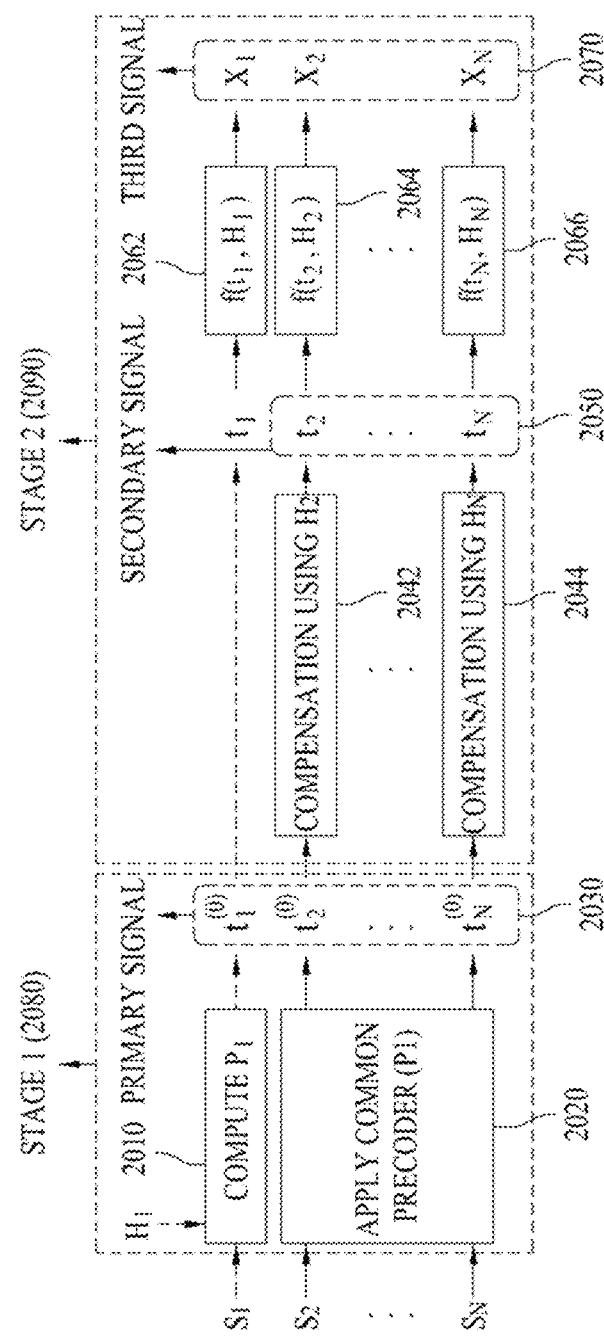
FIG. 20 is a diagram showing a MIMO precoder operational process according to one embodiment of the present invention.

Hereinafter, an operation algorithm of a MIMO transmitter which operates with low complexity while maintaining performance will be proposed with reference to FIG. 20. FIG. 20 is a diagram showing a MIMO precoder operational process according to one embodiment of the present invention. In FIG. 20, an embodiment in which a reference RE is selected from an RE group and a transmission filter (that is, a precoding matrix or precoder) determined based on the channel of the reference RE is shared in the RE group will be described. In the embodiment of FIG. 20, the receiver operation algorithm described with reference to FIGS. 8 and 9 is similarly applicable.

The proposed transmitter operation algorithm includes two stages, that is, stage 1 2080 and stage 2 2090. In stage 1 2080, a common precoder is used to perform a process of generating primary signals. In stage 2 2090, the primary signals are compensated for to generate final transmitted signals. Hereinafter, each stage will be described in detail.

First, in FIG. 20, $P_1$ denotes a precoder generated based on a MIMO channel of a reference RE (2010) and a signal $t_l^{(0)}$ generated by utilizing $P_1$ as a common precoder (2020) at an l-th RE in the RE group is defined as the primary signal (2030). Similarly to the above-described receiver operation algorithm, the reference RE may be determined according to arbitrary criterion. The primary signals are compensated) (2042 and 2044) to obtain a secondary signal $t_l$ (2050) and a function $f(t_l, H_l)$ related to the channel of the RE is additionally applied to the secondary signals (2062, 2064, 2066) to be converted into third signals which are actually transmitted signals (2070). That is, in FIG. 20, stage 1 2080 means a step in which the REs of the RE group use the common precoder and stage 2 2090 means a step in which the REs use information about inherent channels thereof.

In FIG. 20, N denotes the number of REs belonging to the group and the precoder means a zero forcing (ZF), minimum mean square error (MMSE) or regularized ZF precoder or specific terms configuring each precoder.

Each step will now be described in detail. For example, in the regularized ZF scheme, the precoder of the reference RE in the RE group is defined according to Equation 12.

$$\tilde{P}_1 = H_1^{\dagger}(H_1 H_1^{\dagger} + \Gamma_1)_{-1} \qquad \text{Equation 12}$$

In FIG. 20, the common precoder $P_1$ shared in the RE group is $P_1 = (H_1 H_1^{\dagger} + \Gamma_1)^{-1}$ and becomes a term of $\tilde{P}_1$ of Equation 12. The common precoder $P_1$ becomes $P_1 = (H_1 H_1^{\dagger})^{-1}$ if the ZF scheme is used and becomes $$P_1 = \left( H_1 H_1^{\dagger} + \frac{\sigma_w^2}{P} I \right)^{-1}$$

if the MMSE scheme is used. In the MMSE scheme, $\sigma_w^2$ denotes noise variance and P denotes average power of transmitted symbols.

If the common precoder $P_1$ is determined, REs except for the reference RE in the RE group generate respective primary signals using $P_1$. Subsequently, since the primary signal of the reference RE is generated using inherent channel information thereof, the compensation process is not necessary. That is, the primary signal of the reference RE may be used as the secondary signal. In contrast, the primary signals of the REs except for the reference RE are generated using the common precoder instead of the channel information thereof. Accordingly, the secondary signals are generated by performing the process of compensating for errors.

Subsequently, the compensation process of stage 2 will be described. In the compensation process of the REs, for example, in case of a second RE, from the primary signal $t_2^{(0)}$ based on the common precoder and the channel $H_2$ of the second RE, the secondary signal of the second RE may be expressed by Equation 13 below.

$$t_2 = \min \| s_2 - (H_2 H_2^{\dagger} + \Gamma_2) t_2^{(0)} \|^2 \qquad \text{Equation 13}$$

The compensation process according to Equation 13 above may use a CG, Newtonian method and steepest descent method algorithms, similarly to the above-described receiver operation algorithm Equation 14 below shows an embodiment of a compensation process via a CG algorithm $$\begin{aligned}
&\hat{t}^{(0)} = P_1 s_l \\
&z = H_l H_l^{\dagger} \hat{t}^{(0)} + \Gamma_l \hat{t}^{(0)} \\
&g^{(0)} = s_l - z \\
&d^{(0)} = g^{(0)} \\
&\text{while } \|g^{(i)}\| > \delta \|g^{(0)}\| \text{ do} \\
&\quad t = (g^{(i)})^{\dagger} g^{(i)} \\
&\quad z = H_l H_l^{\dagger} d^{(i)} + \Gamma_l d^{(i)} \\
&\quad \alpha^{(i)} = \frac{t}{(d^{(i)})^{\dagger} t} \\
&\quad \hat{t}^{(i+1)} = \hat{t}^{(i)} + \alpha^{(i)} d^{(i)} \\
&\quad g^{(i+1)} = g^{(i)} - \alpha^{(i)} z \\
&\quad \beta^{(i+1)} = \frac{(g^{(i+1)})^{\dagger} g^{(i+1)}}{t} \\
&\quad d^{(i+1)} = g^{(i+1)} + \beta^{(i+1)} d^{(i)} \\
&\text{end while} \\
&t_l = \hat{t}^{(end)}
\end{aligned} \qquad \text{Equation 14}$$

In Equation 14, $\hat{t}^{(i)}$ is a signal estimated via i-th repetition of the CG algorithm. An initial value of $\hat{t}^{(0)}$ of $0^{th}$ repetition is set to the primary signal $t_l^{(0)} = P_1 s_l$. $\hat{g}^{(i)}$, $\hat{d}^{(i)}$, and $b^{(i)}$ denote temporary vectors in the compensation process. A vector $\hat{g}^{(i)}$ is a gradient vector and denotes a fastest direction enabling a repeatedly performed algorithm to derive an accurate value. At this time, if a difference between the updated vector $g_{(i)}$ and the initially generated vector $g^{(0)}$ is less than a specific threshold, repetition of the algorithm is stopped. That is, via the magnitude of the vector $\hat{g}^{(i)}$, the result obtained by directly calculating $P_l$ and the error with the secondary signal can be indirectly confirmed. If the value $g_{(i)}$ is 0, the difference between the secondary signal and the result obtained using $P_l$ is 0. $\delta$ determines an end time of the algorithm As $\delta$ decreases, the number of repetition of the algorithm increases and accuracy of the result increases. In contrast, as $\delta$ increases, the number of repetition of the algorithm decreases and accuracy of the result decreases. If the number of repetitions of the CG algorithm reaches the size of a square matrix, the estimated solution (secondary signal) is theoretically completely equal to a value obtained using $P_l$. That is, the secondary signal $t_l = t^{(N_s)}$ is equal to $P_l s_l$.

By restricting the number of repetitions of the compensation process, it is possible to restrict a maximum time required to generate the secondary signal. That is, in the proposed MIMO transmitter algorithm, if the time required to generate the secondary signal of a specific RE is significantly large, overall processing time is influenced. Accordingly, the time required to generate the secondary signal may be restricted to a specific range. For example, if the number of repetitions of the compensation process is restricted, a maximum number required to generate the secondary signal in the proposed scheme may be restricted. However, if compensation is not sufficiently performed within the restricted number of repetitions, the error between the secondary signal $t_l$ obtained by compensating for the primary signal and the signal $P_l s_l$ directly generated via the channel information may be increased to deteriorate performance.

If the secondary signal is generated via the compensation process, the REs apply a function including the channel information thereof to the secondary signal to generate the third signal. For example, for the reference RE, a function $f(t_1,H_1)=H_1^1 t_1$ is applied to the secondary signal to generate a third signal $X_1$. Similarly, a function $f(H_2,t_2)=H_2^1 t_2$ is applied to a second RE to generate a third signal $x_2$. With respect to the other REs of the group, the precoding signal $x_l$ is generated using the same method as the reference RE and the second RE.

Although the embodiment of generating the secondary signal by compensating for the primary signal has been described, the compensation process may be omitted according to correlation between REs. That is, for REs adjacent to the reference RE, when the primary signal is detected using the common precoder, if the channel correlation between the REs is greater than a predetermined threshold, the compensation process may be omitted and the primary signal may be used as the secondary signal.

That is, the primary signal $t_2^{(O)}$ for the second RE is compensated for to become the secondary signal $t_2$. If compensation is sufficiently performed, $t_2$ becomes $P_2 s_2$. At this time, if correlation between the reference RE and the second RE is greater than the threshold, even when the compensation process is omitted, an error ($\|P_2 s_2 - t_2^{(O)}\|$) between the primary signal $t_2^{(O)}$ and $P_2 s_2$ may be small enough to be ignored. If such an error hardly influences performance deterioration, the primary signal may not be compensated for and may be determined as the secondary signal.

Figure 21:
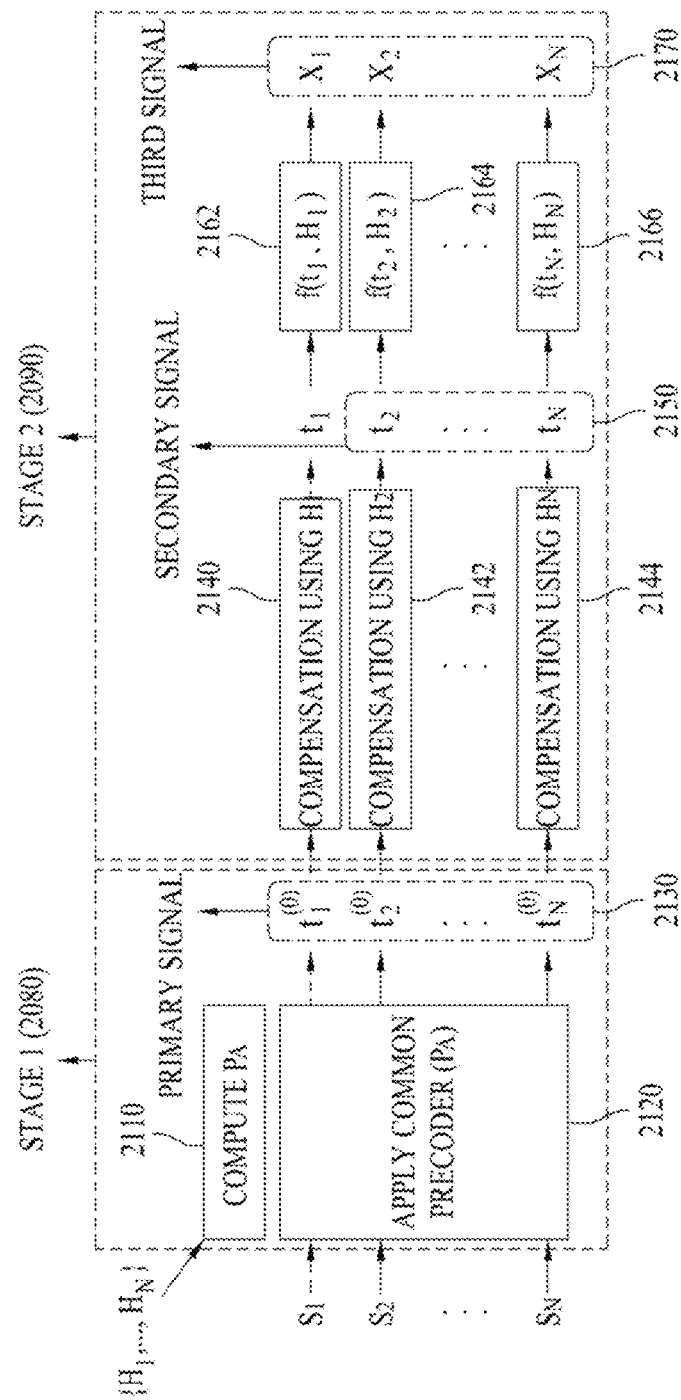
FIG. 21 is a diagram showing a MIMO precoder operational process according to another embodiment of the present invention.

FIG. 21 is a diagram showing a MIMO precoder operational process according to another embodiment of the present invention. FIG. 21 shows an embodiment of determining a common precoder using all channels of an RE group similarly to the receiver operation algorithm of FIG. 10.

In FIG. 21, a new channel matrix is defined based on channel information of all REs in the RE group and is expressed by Equation 15 below.

$$H_A = \frac{1}{N}\sum_{l=1}^{N} w_l H_l \qquad \text{Equation 15}$$

In Equation 15, N denotes the number of REs in the RE group. $w_l$ denotes a weight of each channel matrix and, in case of $w_l=1$, $H_A$ is defined as an average of all channel matrices. The common precoder shared in the group based on the channel matrices is defined by Equation 16.

$$B_A = (G_A^H G_A + \Gamma_A)^{-1} G_A^H \qquad \text{Equation 16}$$

In FIG. 16, $$\Gamma_A = \frac{1}{N}\sum_{l=1}^{N} w_l' \Gamma_l$$

is defined and $w_l$ is a weight of each $\Gamma_l$.

That is, in the embodiment of FIG. 21, the common precoder $P_A$ is computed based on the channels of all the REs (2110) and the primary signals of all the REs are generated using the common precoder (2120 and 2130). FIG. 21 is different from FIG. 20 in that the primary signal for the first RE (that is, the reference RE) is generated using the common precoder. Thus, the primary signal for the first RE is also compensated for to generate the secondary signal. FIG. 21 is similar to FIG. 20 in the other processes.

Figure 22:
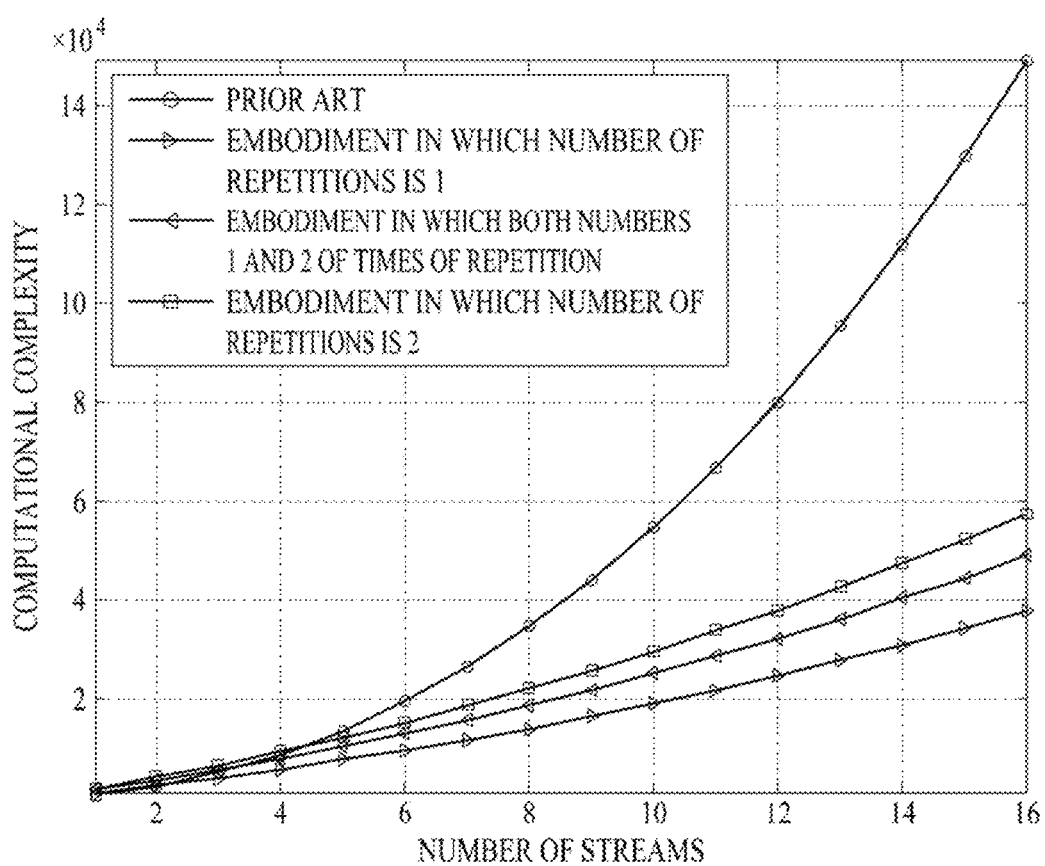
FIG. 22 is a graph for comparison in computational complexity between the prior art and embodiments of the present invention.

FIG. 22 is a graph for comparison in computational complexity between the prior art and embodiments of the present invention.

FIG. 22 shows a graph for comparison between computational complexity when the REs shown in FIG. 18 are solved using the conventional receiver operation algorithm and computational complexity when the REs shown in FIG. 18 are solved using the operation algorithms of the proposed embodiments. Among three methods of the proposed embodiment, if the numbers 1 and 2 of times of repetition are simultaneously applied, the compensation process is repeated once with respect to a half of 16 REs of FIG. 18 and the compensation process is repeated twice with respect to the remaining half of the 16 REs. As shown, the transmitter operation algorithm according to the proposed embodiment can obtain more gain in terms of computational complexity as compared to the prior art as the number of transmitted streams increases.

In the above-proposed transmitter operation algorithm, the precoder $P_1$ computed with respect to the reference RE in the RE group is shared among all REs. If correlation between all the REs and the reference RE is 1, even when $P_1$ is only used, it is possible to generate accurate transmitted signals with respect to all the REs. In this case, since only one $P_1$ is computed with respect to the RE group, implementation complexity of the transmission precoder is reduced to 1/16.

If correlation between the REs and the reference RE is less than 1, an error occurs between the primary signal computed using the common precoder and the primary signal computed using an inherent channel. In this case, as correlation with the reference RE increases, the error of the primary signal decreases. Therefore, the number of repetitions and time required to perform the compensation process for acquiring the secondary signal are reduced. Even when correlation is small and thus the error is large, the number of repetitions may be increased to generate accurate transmitted signals. As a result, the proposed transmitter operation algorithm may use correlation between REs, thereby reducing computational complexity while minimizing performance deterioration.

In addition, by restricting the number of repetitions of the compensation process, the error of the secondary signal can be allowed within an allowable range, thereby reducing complexity. Accordingly, the proposed transmitter operation algorithm can control trade-off between computational complexity and performance in consideration of a communication environment and an SNR region.

In addition, an inverse matrix computation process is performed with respect to the reference RE only, thereby reducing memory requirements necessary for inverse matrix computation. That is, since all operations except for the inverse matrix computation process of the reference RE are performed via the operation of the matrix X vector, parallelism is very easy. Therefore, a distribution scheme is easily applied to significantly reduce the total processing time.

In the conventional MIMO transmitter, all the REs in the RE group share one precoder, thereby reducing complexity necessary to generate the precoder. However, this method does not consider the MIMO channel properties of each RE, such that interference influence is not appropriately controlled. When the base station simultaneously supports several UEs, the conventional transmitter operation algorithm causes interference, reducing system throughput. Therefore, a UE requires a very complicated receiver in order to control system throughput. In particular, as channel correlation between REs of the RE group decreases, interference influence increases and performance deterioration increases.

In contrast, the proposed MIMO transmitter operation algorithm can solve the technical problems of the conventional algorithm by performing stage 1 in which the REs in the RE group use the common precoder and stage 2 in which the MIMO channel properties of each RE are applied.

3. Apparatus Configuration

Figure 23:
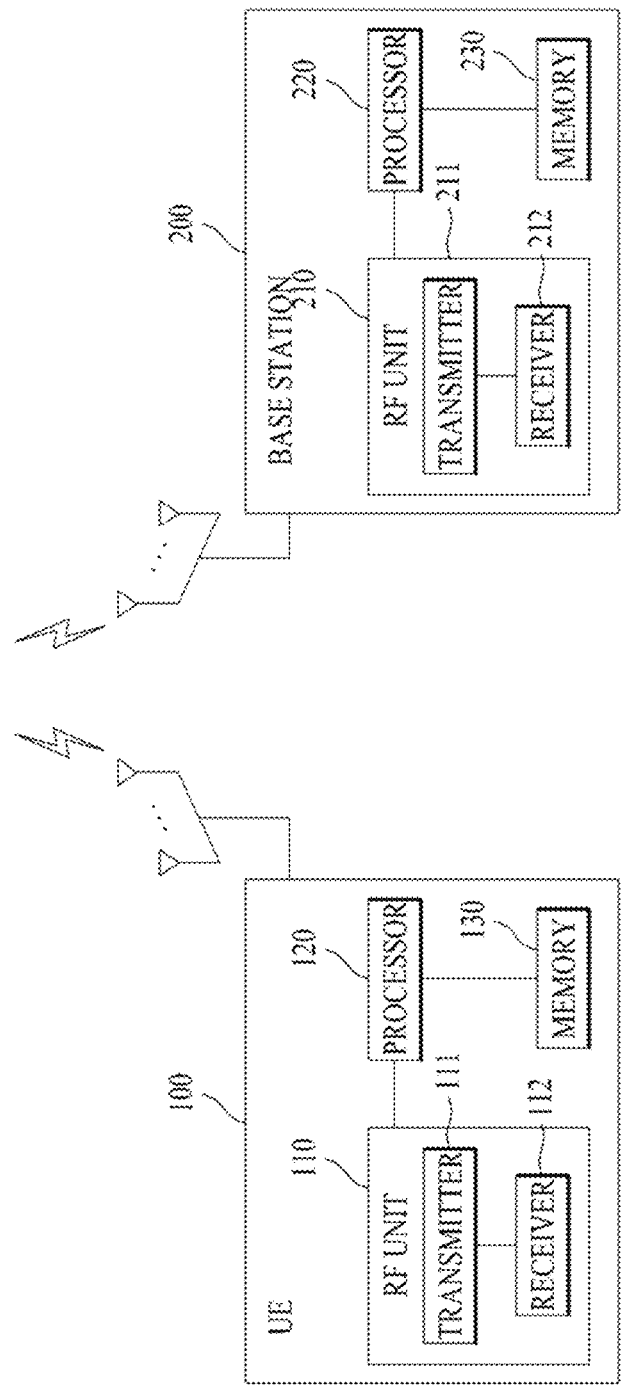
FIG. 23 is a block diagram showing the configuration of a UE and a base station according to one embodiment of the present invention.

FIG. 23 is a block diagram showing the configuration of a UE and a base station according to one embodiment of the present invention.

In FIG. 23, a UE and the base station may include radio frequency (RF) units 110 and 210, processors 120 and 220 and memories 130 and 230, respectively. Although a 1:1 communication environment between the UE 100 and the base station 200 is shown in FIG. 23, a communication environment may be established between a plurality of UEs and the base station 200. In addition, the base station 200 shown in FIG. 23 is applicable to a macro cell base station and a small cell base station.

The RF units 110 and 210 may include transmitters 112 and 212 and receivers 114 and 214, respectively. The transmitter 112 and the receiver 114 of the UE 100 are configured to transmit and receive signals to and from the base station 200 and other UEs and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present invention.

The transmitter 212 and the receiver 214 of the base station 200 are configured to transmit and receive signals to and from another base station and the UEs and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the UE 100 and the base station 200 instruct (for example, control, adjust, or manage) the operations of the UE 100 and the base station 200, respectively. The processors 120 and 220 may be connected to the memories 130 and 180 for storing program code and data, respectively. The memories 130 and 180 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

The present invention can also be embodied as computer-readable code on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of generating transmitted signals by a multiple input multiple output (MIMO) transmitter including a plurality of antennas, the method comprising:
    selecting a reference resource element (RE) from an RE group including a plurality of REs;
    generating a common precoder to be shared among the plurality of REs of the RE group based on channel information of the reference RE;
    generating primary signals, which are precoding signals of the plurality of REs, by applying the common precoder to transmitted data for the plurality of REs; and
    generating secondary signals by compensating for the primary signals of the REs except for the reference RE among the plurality of REs using channel information of the REs.

2. The method according to claim 1, further comprising generating third signals, which are transmitted signals, by converting the primary signal of the reference RE and the secondary signals of the REs except for the reference RE among the plurality of REs.

3. The method according to claim 2, wherein:
    the third signals are generated based on a function $f(t_n, H_n) = H_n^\dagger t_n$ (n=1, 2, ..., N) to which the channel information of the plurality of REs is applied, and
    in the function, $H_n$ denotes a MIMO channel of an n-th RE in an resource block, $t_n$ denotes the primary signal (n=1) of the reference RE or the secondary signals (n=2, 3, ..., N) of the REs except for the reference RE, and N denotes the number of REs in the RE group.

4. The method according to claim 1, wherein the common precoder is a portion of a zero forcing (ZF) precoding matrix, a regularized ZF precoding matrix or a minimum mean square error (MMSE) precoding matrix.

5. The method according to claim 1, wherein the secondary signals are generated by compensating for the primary signals via the channel information of the REs and a conjugate gradient (CG), Newtonian method or steepest descent method algorithm.

6. The method according to claim 5, wherein:
    the secondary signals are generated by repeatedly performing a compensation process until errors between results computed using the channel information of the REs instead of the common precoder and the primary signals become less than a threshold, and a maximum number of repetitions of the compensation process is determined according to a MIMO channel environment or user input.

7. The method according to claim 6, wherein:
the number of repetitions of the compensation process is differently set according to the REs except for the reference RE, and
the number of repetitions is inversely proportional to correlation between the reference RE and the REs except for the reference RE.

8. The method according to claim 1, wherein:
the generating the common precoder includes generating the common precoder by taking into account the channel information of the reference RE and the channel information of the REs except for the reference RE, and
the generating the secondary signals includes generating the second signals by compensating for the primary signals of the REs except for the reference RE and the primary signal of the reference RE based on respective inherent channels thereof.

9. A multiple input multiple output (MIMO) transmitter including a plurality of antennas and configured to generate transmitted signals to be transmitted via the plurality of antennas, the MIMO transmitter comprising:
a transmitter;
a receiver; and
a processor connected to the transmitter and the receiver and configured to generate the transmitted signals,
wherein the processor:
selects a reference resource element (RE) from an RE group including a plurality of REs,
generates a common precoder to be shared among the plurality of REs of the RE group based on channel information of the reference RE,
generates primary signals, which are precoding signals of the plurality of REs, by applying the common precoder to transmitted data for the plurality of REs, and
generates secondary signals by compensating for the primary signals of the REs except for the reference RE among the plurality of REs using channel information of the REs.

10. The MIMO transmitter according to claim 9, wherein the processor generates third signals, which are transmitted signals, by converting the primary signal of the reference RE and the secondary signals of the REs except for the reference RE among the plurality of REs.

11. The MIMO transmitter according to claim 10, wherein:
the third signals are generated based on a function $f(t_n, H_n) = H_n^\dagger t_n$ (n=1, 2, . . . , N) to which the channel information of the plurality of REs is applied, and
in the function, $H_n$ denotes a MIMO channel of an n-th RE in an resource block, $t_n$ denotes the primary signal (n=1) of the reference RE or the secondary signals (n=2, 3, . . . , N) of the REs except for the reference RE, and N denotes the number of REs in the RE group.

12. The MIMO transmitter according to claim 9, wherein the common precoder is a portion of a zero forcing (ZF) precoding matrix, a regularized ZF precoding matrix or a minimum mean square error (MMSE) precoding matrix.

13. The MIMO transmitter according to claim 9, wherein the secondary signals are generated by compensating for the primary signals via the channel information of the REs and a conjugate gradient (CG), Newtonian method or steepest descent method algorithm.

14. The MIMO transmitter according to claim 13, wherein:
the secondary signals are generated by repeatedly performing a compensation process until errors between results computed using the channel information of the REs instead of the common precoder and the primary signals become less than a threshold, and
a maximum number of repetitions of the compensation process is determined according to a MIMO channel environment or user input.

15. The MIMO transmitter according to claim 14, wherein:
the number of repetitions of the compensation process is differently set according to the REs except for the reference RE, and
the number of repetitions is inversely proportional to correlation between the reference RE and the REs except for the reference RE.

16. The MIMO transmitter according to claim 9, wherein the processor:
generates the common precoder by taking into account the channel information of the reference RE and the channel information of the REs except for the reference RE, and
generates the second signals by compensating for the primary signals of the REs except for the reference RE and the primary signal of the reference RE based on respective inherent channels thereof.

* * * * *